US012707500B2

(12) United States Patent
Mukherjee et al.

(10) Patent No.: US 12,707,500 B2
(45) **Date of Patent: *Aug. 11, 2026**

(54) APPARATUS AND METHODS FOR MULTICARRIER UNLICENSED HETEROGENEOUS CHANNEL ACCESS

(71) Applicant: Charter Communications Operating, LLC, St. Louis, MO (US)

(72) Inventors: Amitav Mukherjee, Elk Grove, CA (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/079,353

(22) Filed: Dec. 12, 2022

(65) Prior Publication Data

US 2023/0199851 A1 Jun. 22, 2023

Related U.S. Application Data

(63) Continuation of application No. 16/567,509, filed on Sep. 11, 2019, now Pat. No. 11,528,748.

(51) Int. Cl.
*H04W 74/0808* (2024.01)
*H04W 16/14* (2009.01)
(Continued)

(52) U.S. Cl.
CPC ....... *H04W 74/0825* (2013.01); *H04W 16/14* (2013.01); *H04W 24/10* (2013.01); *H04W 72/0453* (2013.01)

(58) Field of Classification Search
CPC . H04W 74/0825; H04W 16/14; H04W 24/10; H04W 72/0453
See application file for complete search history.

(56) References Cited

U.S. PATENT DOCUMENTS

| | | | |
|---|---|---|---|
| 5,991,308 | A | 11/1999 | Fuhrmann et al. |
| 5,995,499 | A | 11/1999 | Hottinen et al. |

(Continued)

FOREIGN PATENT DOCUMENTS

| | | | |
|---|---|---|---|
| CA | 3154554 | A1 | 3/2021 |
| EP | 2294860 | A1 | 3/2011 |

(Continued)

OTHER PUBLICATIONS

3GPP TS 38.889 3rd Generation Partnership Project; Technical Specification Group Radio Access Network; Study on NR-based Access to Unlicensed Spectrum; Release 16, (Nov. 2018), 120 pages.

(Continued)

*Primary Examiner* — Rhonda L Murphy
(74) *Attorney, Agent, or Firm* — Patent Beach PC

(57) ABSTRACT

Apparatus and methods for multi-carrier or multi-band utilization in an unlicensed wireless network. In one embodiment, the apparatus and methods provide enhanced wireless services which provide enhanced bandwidth capability to 5G NR-U entities such as gNodeB and UE devices across two heterogeneous unlicensed bands having different medium access mechanism and protocols. In one variant, LBT (listen before talk) protocols are used to detect the presence or absence of users within the respective bands of interest. When two or more unoccupied carriers or bands are identified, aggregated operation is used ti enhance the downlink/uplink (DL/UL) transmission bandwidth for the device(s).

20 Claims, 31 Drawing Sheets

(51) Int. Cl.
*H04W 24/10* (2009.01)
*H04W 72/0453* (2023.01)

(56) References Cited

U.S. PATENT DOCUMENTS 6,154,648 A 11/2000 Comer
6,356,560 B1 3/2002 Venters et al.
6,757,837 B1 6/2004 Platt et al.
6,771,953 B1 8/2004 Chow et al.
6,782,262 B1 8/2004 Lundborg
7,269,151 B2 9/2007 Diener et al.
7,293,201 B2 11/2007 Ansari
7,573,819 B2 8/2009 Krzanowski et al.
8,218,422 B2 7/2012 Venturino et al.
RE43,760 E 10/2012 Abel et al.
8,719,847 B2 5/2014 Agarwal et al.
8,997,136 B2 3/2015 Brooks et al.
9,258,809 B2 2/2016 Liao et al.
9,386,496 B2 7/2016 Gupta et al.
9,473,957 B2 10/2016 Wellington
9,526,056 B2 12/2016 Tomici et al.
9,699,663 B1 7/2017 Jovancevic
9,769,692 B2 9/2017 Freda et al.
9,807,778 B2 10/2017 Ma et al.
9,813,148 B2 11/2017 Syed et al.
9,887,864 B1 2/2018 Han et al.
9,986,578 B2 5/2018 Gunasekara
10,003,548 B2 6/2018 Lee et al.
10,033,505 B2 7/2018 Malladi et al.
10,098,568 B2 10/2018 Gazdzinski
10,135,730 B2 11/2018 Chou
10,164,858 B2 12/2018 Gunasekara et al.
10,271,351 B1 4/2019 Wang
10,340,976 B2 7/2019 Kakinada et al.
10,368,255 B2 7/2019 Gunasekara et al.
10,368,361 B2 7/2019 Huang
10,405,192 B2 9/2019 Kakinada et al.
10,419,943 B1 9/2019 Wong et al.
10,452,342 B2 10/2019 Triplett
10,484,876 B2 11/2019 Shah et al.
10,492,204 B2 11/2019 Kakinada et al.
10,499,409 B2 12/2019 Shattil
10,506,456 B2 12/2019 Lou et al.
10,531,309 B1 1/2020 Li et al.
10,536,859 B2 1/2020 Gunasekara et al.
10,560,772 B2 2/2020 Gunasekara
10,624,079 B2 4/2020 Xu et al.
10,638,361 B2 4/2020 Gunasekara et al.
10,645,547 B2 5/2020 Gunasekara et al.
10,680,883 B2 6/2020 Hall et al.
10,750,462 B2 8/2020 Kadambar et al.
10,764,841 B2 9/2020 Syed et al.
10,805,562 B2 10/2020 Nakamura et al.
10,885,569 B2 1/2021 Ogaz et al.
10,945,161 B2 3/2021 Syed et al.
10,945,250 B2 3/2021 Kwon et al.
10,980,025 B2 4/2021 Hmimy et al.
11,026,205 B2 6/2021 Hmimy et al.
11,129,171 B2 9/2021 Hmimy
11,190,861 B2 11/2021 Bali
11,219,026 B2 1/2022 Kakinada et al.
11,317,296 B2 4/2022 Vaidya et al.
11,363,466 B2 6/2022 Khalid et al.
11,432,284 B2 8/2022 Hmimy et al.
11,438,771 B2 9/2022 Syed et al.
11,457,485 B2 9/2022 Khalid et al.
11,483,715 B2 10/2022 Sevindik et al.
11,523,306 B1 12/2022 Chu et al.
12,009,885 B2 * 6/2024 Murakami ........... H04B 7/0413
12,231,248 B2 * 2/2025 Fehrenbach .......... H04L 1/0038
2002/0126748 A1 9/2002 Rafie et al.
2003/0158906 A1 8/2003 Hayes
2003/0229899 A1 12/2003 Thompson et al.
2004/0001021 A1 1/2004 Choo et al.
2004/0139177 A1 7/2004 Yook
2004/0196834 A1 10/2004 Ofek et al.
2006/0188004 A1 8/2006 Kizu et al.
2006/0268676 A1 11/2006 Gore et al.
2008/0010506 A1 1/2008 Tabei et al.
2008/0097913 A1 4/2008 Dicks et al.
2008/0220786 A1 9/2008 Beacham
2008/0220788 A1 9/2008 Stanwood et al.
2009/0028182 A1 1/2009 Brooks et al.
2009/0034443 A1 2/2009 Walker et al.
2009/0129273 A1 5/2009 Zou
2009/0163140 A1 6/2009 Packham et al.
2009/0170472 A1 7/2009 Chapin et al.
2009/0253438 A1 10/2009 Chater-Lea et al.
2010/0035611 A1 2/2010 Montojo et al.
2010/0094956 A1 4/2010 Zuckerman et al.
2010/0128608 A1 5/2010 Zou et al.
2010/0202450 A1 8/2010 Ansari et al.
2010/0234042 A1 9/2010 Chan et al.
2011/0014924 A1 1/2011 Hwang et al.
2011/0210849 A1 9/2011 Howard et al.
2011/0292970 A1 12/2011 Lansford et al.
2012/0079507 A1 3/2012 Agarwal et al.
2012/0188877 A1 7/2012 Chin et al.
2013/0039200 A1 2/2013 Park et al.
2013/0110565 A1 5/2013 Means, Jr. et al.
2013/0122903 A1 5/2013 Farnsworth et al.
2013/0182602 A1 7/2013 Lee et al.
2013/0191495 A1 7/2013 Almstrand et al.
2013/0258997 A1 10/2013 Chen
2013/0279376 A1 10/2013 Ahmadi
2013/0281092 A1 10/2013 Gassend
2013/0288675 A1 10/2013 Gassend
2013/0303145 A1 11/2013 Harrang et al.
2013/0315124 A1 11/2013 Rapaport et al.
2013/0336175 A1 12/2013 Um et al.
2014/0106672 A1 4/2014 Jeon et al.
2014/0139422 A1 5/2014 Mistry et al.
2014/0194068 A1 7/2014 Coppage et al.
2014/0199991 A1 7/2014 Mukherjee et al.
2014/0215457 A1 7/2014 Gava et al.
2014/0241187 A1 8/2014 Barkay et al.
2014/0269526 A1 9/2014 Mitola, III
2014/0308986 A1 10/2014 Yang et al.
2015/0055623 A1 2/2015 Li et al.
2015/0071239 A1 3/2015 Zhang et al.
2015/0120000 A1 4/2015 Coffey et al.
2015/0133173 A1 5/2015 Edge et al.
2015/0139175 A1 5/2015 Ratasuk et al.
2015/0181546 A1 6/2015 Freda et al.
2015/0181589 A1 6/2015 Luo et al.
2015/0208262 A1 7/2015 Siomina
2015/0235670 A1 8/2015 Kim et al.
2015/0280847 A1 10/2015 Somasundaram et al.
2015/0304856 A1 10/2015 Garcia et al.
2015/0334664 A1 11/2015 Sawai et al.
2015/0341753 A1 11/2015 Chen et al.
2015/0358968 A1 12/2015 Malladi et al.
2016/0007147 A1 1/2016 Zhang et al.
2016/0021661 A1 1/2016 Yerramalli et al.
2016/0073259 A1 3/2016 Lee et al.
2016/0077782 A1 3/2016 Choi et al.
2016/0128001 A1 5/2016 Tsuda
2016/0165066 A1 6/2016 Yang et al.
2016/0174043 A1 6/2016 Ko et al.
2016/0174268 A1 6/2016 Hu et al.
2016/0182134 A1 6/2016 Kol et al.
2016/0212031 A1 7/2016 Jain et al.
2016/0234746 A1 8/2016 Gopal et al.
2016/0249350 A1 * 8/2016 Koutsimanis ..... H04W 74/0808
2016/0269978 A1 9/2016 Bashar et al.
2016/0330743 A1 11/2016 Das et al.
2016/0373170 A1 12/2016 Szini et al.
2016/0381600 A1 12/2016 Aksu
2017/0013422 A1 1/2017 Saiwai et al.
2017/0013479 A1 1/2017 Sun et al.
2017/0026157 A1 1/2017 Bugenhagen et al.
2017/0026203 A1 1/2017 Thomas et al.
2017/0140286 A1 5/2017 Basu et al.
2017/0150523 A1 5/2017 Patel et al.

(56) References Cited

U.S. PATENT DOCUMENTS

2017/0155703 A1 6/2017 Hao et al.
2017/0164326 A1 6/2017 Worrall
2017/0187966 A1 6/2017 Oetting
2017/0188241 A1 6/2017 Mueck et al.
2017/0208540 A1 7/2017 Egner et al.
2017/0208560 A1 7/2017 Papa et al.
2017/0272955 A1 9/2017 Sadek et al.
2017/0295497 A1 10/2017 Macmullan et al.
2017/0295578 A1 10/2017 Khoshnevisan et al.
2017/0303138 A1 10/2017 Barmettler et al.
2017/0311290 A1 10/2017 Adjakple et al.
2017/0318472 A1 11/2017 Yu et al.
2017/0325251 A1 11/2017 Sadek
2018/0007587 A1 1/2018 Feldman et al.
2018/0034524 A1 2/2018 Pao et al.
2018/0035463 A1 2/2018 Mallik et al.
2018/0049036 A1 2/2018 Sethi et al.
2018/0063736 A1 3/2018 Sadeghi et al.
2018/0063758 A1 3/2018 Velu
2018/0077518 A1 3/2018 Nguyen et al.
2018/0107577 A1 4/2018 Johnsson et al.
2018/0115903 A1 4/2018 Badic et al.
2018/0124613 A1 5/2018 Kang et al.
2018/0132112 A1 5/2018 Khoshnevisan et al.
2018/0146058 A1 5/2018 Somayazulu et al.
2018/0146408 A1 5/2018 Meylan et al.
2018/0167948 A1 6/2018 Egner et al.
2018/0181119 A1 6/2018 Lee et al.
2018/0192443 A1 7/2018 Novlan et al.
2018/0199214 A1 7/2018 Shen
2018/0234403 A1 8/2018 Casella et al.
2018/0235007 A1 8/2018 Gou et al.
2018/0239425 A1 8/2018 Jang
2018/0242184 A1 8/2018 Yerramalli et al.
2018/0255576 A1 9/2018 Bhorkar et al.
2018/0279212 A1 9/2018 Malik et al.
2018/0300551 A1 10/2018 Luccin et al.
2018/0316563 A1 11/2018 Kumar et al.
2018/0323938 A1 11/2018 Takeda et al.
2019/0021012 A1 1/2019 Beck et al.
2019/0028182 A1 1/2019 Smyth et al.
2019/0029040 A1 1/2019 Sun et al.
2019/0037480 A1 1/2019 Sun et al.
2019/0044614 A1 2/2019 Khoshnevisan et al.
2019/0081690 A1 3/2019 Mueck et al.
2019/0082447 A1 3/2019 Harsha et al.
2019/0098510 A1 3/2019 Guo et al.
2019/0098632 A1 3/2019 Martin et al.
2019/0104033 A1 4/2019 Carey
2019/0104551 A1 4/2019 Deenoo et al.
2019/0120969 A1 4/2019 Hamzeh et al.
2019/0132882 A1 5/2019 Li et al.
2019/0150182 A1 5/2019 Koorapaty et al.
2019/0150190 A1 5/2019 Kim et al.
2019/0182895 A1 6/2019 Di Girolamo et al.
2019/0213423 A1 7/2019 Haberstroh et al.
2019/0222266 A1 7/2019 Cui et al.
2019/0223025 A1 7/2019 Kakinada et al.
2019/0223180 A1 7/2019 Fehrenbach et al.
2019/0226898 A1 7/2019 Gray, Jr.
2019/0230613 A1 7/2019 Kim et al.
2019/0230706 A1 7/2019 Li et al.
2019/0239190 A1 8/2019 Patel et al.
2019/0253878 A1 8/2019 Yu et al.
2019/0293748 A1 9/2019 Gulati et al.
2019/0296789 A1 9/2019 Yu et al.
2019/0319699 A1 10/2019 Lee et al.
2019/0319814 A1 10/2019 Das
2019/0320490 A1 10/2019 Liu et al.
2019/0325154 A1 10/2019 Divakaran et al.
2019/0349848 A1 11/2019 Bali
2019/0364492 A1 11/2019 Azizi et al.
2019/0364565 A1 11/2019 Hmimy et al.
2019/0373615 A1 12/2019 Cimpu et al.
2019/0387413 A1 12/2019 Wong et al.
2019/0393926 A1 12/2019 Kakinada et al.
2019/0394790 A1 12/2019 Damnjanovic et al.
2020/0015147 A1 1/2020 Malkamaki et al.
2020/0021689 A1 1/2020 Sultana et al.
2020/0025629 A1 1/2020 Zinger et al.
2020/0053545 A1 2/2020 Wong et al.
2020/0059795 A1 2/2020 Kakinada et al.
2020/0059931 A1 2/2020 Hannan et al.
2020/0083892 A1 3/2020 Kundu et al.
2020/0084759 A1 3/2020 Liu et al.
2020/0106678 A1 4/2020 Grill et al.
2020/0126551 A1 4/2020 Xiong et al.
2020/0137806 A1 4/2020 Islam et al.
2020/0146058 A1 5/2020 Xu et al.
2020/0186378 A1 6/2020 Six et al.
2020/0187150 A1 6/2020 Eisner
2020/0221392 A1 7/2020 Xue et al.
2020/0228993 A1 7/2020 Gunasekara et al.
2020/0252933 A1 8/2020 Hmimy et al.
2020/0259896 A1 8/2020 Sachs et al.
2020/0275457 A1 8/2020 Hmimy
2020/0281008 A1 9/2020 Aboul-Magd et al.
2020/0288523 A1* 9/2020 Patil ...................... H04W 80/02
2020/0296627 A1 9/2020 Arvidson et al.
2020/0305159 A1 9/2020 Raghothaman et al.
2020/0313838 A1 10/2020 Jin et al.
2020/0336868 A1 10/2020 Gunasekara et al.
2020/0337054 A1 10/2020 Kwok et al.
2020/0344515 A1 10/2020 Wong et al.
2020/0351989 A1 11/2020 Ahmet et al.
2021/0037444 A1 2/2021 Harel
2021/0051653 A1 2/2021 Park et al.
2021/0058863 A1 2/2021 Kalhan
2021/0076424 A1 3/2021 Mukherjee et al.
2021/0084117 A1 3/2021 Ovadia et al.
2021/0105633 A1 4/2021 Vaidya et al.
2021/0126662 A1 4/2021 Solichien
2021/0127423 A1 4/2021 Park et al.
2021/0136838 A1 5/2021 Khalid et al.
2021/0167883 A1 6/2021 Yoon
2021/0204322 A1 7/2021 Lou et al.
2021/0211887 A1 7/2021 Jones
2021/0219303 A1 7/2021 Khalid et al.
2021/0234648 A1 7/2021 Parekh et al.
2021/0235495 A1 7/2021 Xu et al.
2021/0266914 A1 8/2021 Yoo et al.
2021/0274499 A1 9/2021 Hmimy et al.
2021/0274506 A1 9/2021 Raghavan et al.
2021/0297979 A1 9/2021 Hmimy et al.
2021/0376905 A1 12/2021 Zhou et al.
2022/0007200 A1 1/2022 Sevindik et al.
2022/0007374 A1 1/2022 Sevindik et al.
2022/0078804 A1 3/2022 Hmimy
2022/0132524 A1 4/2022 Mueck et al.
2022/0167176 A1 5/2022 Khalid
2022/0183093 A1 6/2022 Sevindik et al.
2022/0191675 A1 6/2022 Mukherjee
2022/0407653 A1 12/2022 Kakishima et al.
2023/0012713 A1 1/2023 Khalid et al.

FOREIGN PATENT DOCUMENTS

EP 3741168 A1 11/2020
EP 3797546 A1 3/2021
GB 2585394 A 1/2021
JP 2021510973 A 4/2021
WO WO-2005065198 A2 7/2005
WO WO-2010002324 A1 1/2010
WO WO-2013020599 A1 2/2013
WO WO-2017130494 A1 8/2017
WO WO-2017186294 A1 11/2017
WO WO-2017195078 A1 11/2017
WO WO-2018144976 A2 8/2018
WO WO-2019014361 A1 1/2019
WO WO-2019067120 A1 4/2019
WO WO-2019132980 A1 * 7/2019 ........ H04L 27/2602
WO WO-2019139691 A1 7/2019
WO WO-2019140461 A1 7/2019
WO WO-2019226838 A1 11/2019

(56) References Cited

FOREIGN PATENT DOCUMENTS

| | | | |
|---|---|---|---|
| WO | WO-2020160403 | A1 | 8/2020 |
| WO | WO-2020167222 | A2 | 8/2020 |
| WO | WO-2021050957 | A1 | 3/2021 |
| WO | WO-2021067810 | A1 | 4/2021 |
| WO | WO-2021086986 | A1 | 5/2021 |

OTHER PUBLICATIONS

"Fact Sheet* Unlicensed Use of the 6 GHz Band Notice of Proposed Rulemaking" dated Oct. 2, 2018 (available at https://docs.fcc.gov/public/attachments/DOC-354364A1.pdf ).

IEEE 802.11 standard, 1997, URL: http://www.ieeexplore.IEEE.org/documenU654779 , 459 pages.

Palola M., et al., "Field Trial of the 3.5 GHz Citizens Broadband Radio Service Governed by a Spectrum Access System (SAS)," IEEE International Symposium on Dynamic Spectrum Access Networks, 2017, 9 pages.

RAN WG1 Meeting #79, San Francisco, USA, Apr. 17-21, 2014.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Souryal, Michael R., et al., "Effect of Federal Incumbent Activity on CBRS Commercial Service", International Symposium on Dynamic Spectrum Access Networks (DySPAN), IEEE 2019, 5 pages.

Wi-Fi Direct, "Wi-Fi Peer-to-Peer (P2P) Specification," Wi-Fi Alliance, Version 1.5, 2014, 183 pages.

Kulacz, Lukasz, et al., "Coordinated Spectrum Allocation and Co-existence Management in CBRS-SAS Wireless Networks." IEEE Access 07, pp. 139294-139316. (Year: 2019).

Deering, S., et al., "Internet Protocol, Version 6 (IPv6) Specification," Internet Engineering Task Force (IETF) RFC 2460, Dec. 1998, 39 pages.

IEEE Std. 802.11 or related standards including 802.11a/b/g/n/s/v/ac/ad/ax/ay/ba/be or 802.11-2012/2013, 802.Nov. 2016.

"Internet Protocol, DARPA Internet Program, Protocol Specification", IETF RCF 791, Sep. 1981, 50 pages.

* cited by examiner 700
702
DETERMINE BANDWIDTH REQUIREMENTS ($BW_R$)
704
COMPARE BANDWIDTH REQUIREMENTS TO AVAILABLE BANDWIDTH ($BW_A$)
706
$BW_R > BW_A$?
No
Yes
708
INVOKE MULTI-BAND LBT PROCEDURES

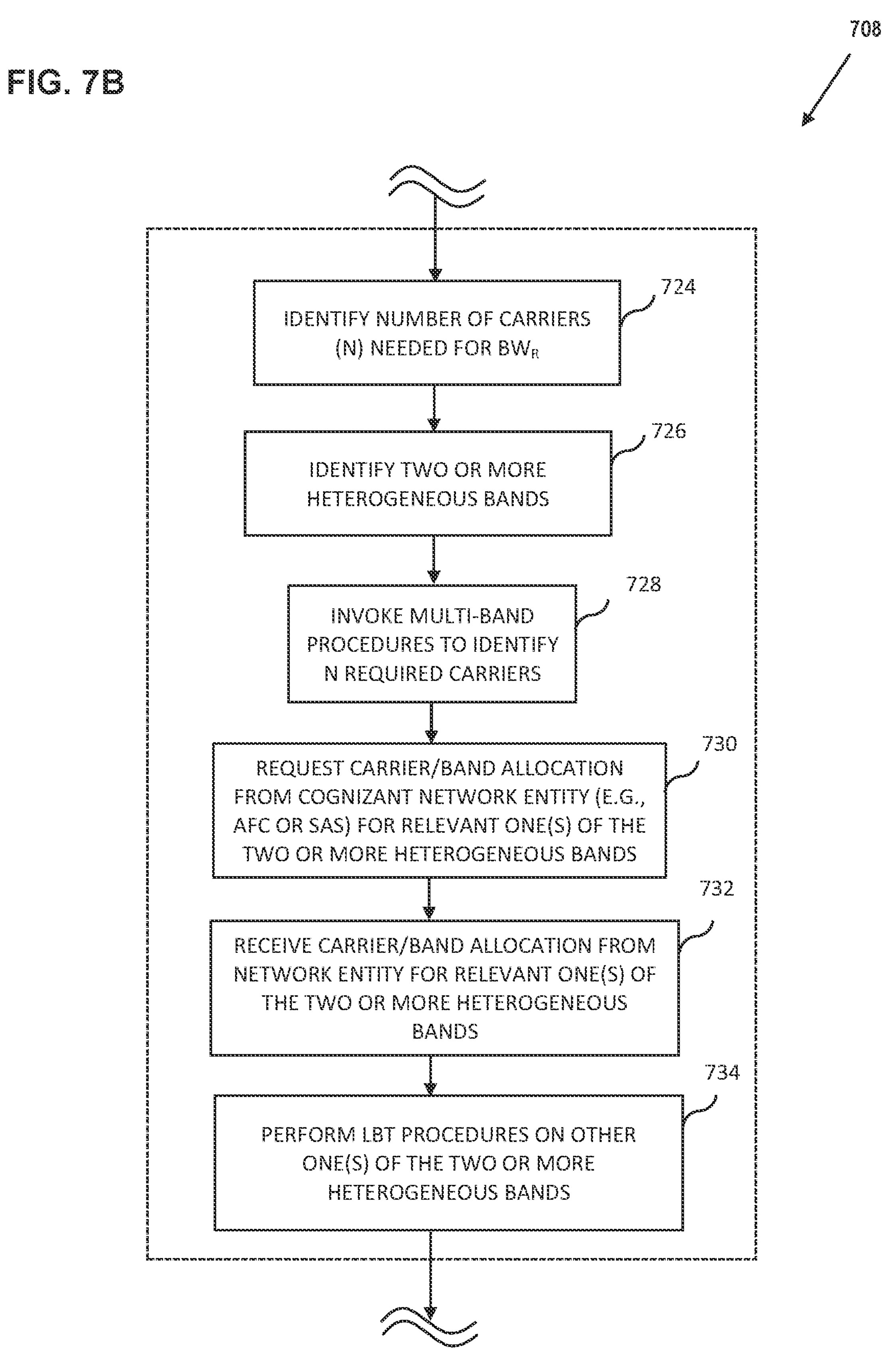
FIG. 7B
708
724
IDENTIFY NUMBER OF CARRIERS (N) NEEDED FOR BW_R
726
IDENTIFY TWO OR MORE HETEROGENEOUS BANDS
728
INVOKE MULTI-BAND PROCEDURES TO IDENTIFY N REQUIRED CARRIERS
730
REQUEST CARRIER/BAND ALLOCATION FROM COGNIZANT NETWORK ENTITY (E.G., AFC OR SAS) FOR RELEVANT ONE(S) OF THE TWO OR MORE HETEROGENEOUS BANDS
732
RECEIVE CARRIER/BAND ALLOCATION FROM NETWORK ENTITY FOR RELEVANT ONE(S) OF THE TWO OR MORE HETEROGENEOUS BANDS
734
PERFORM LBT PROCEDURES ON OTHER ONE(S) OF THE TWO OR MORE HETEROGENEOUS BANDS

Figure 11:
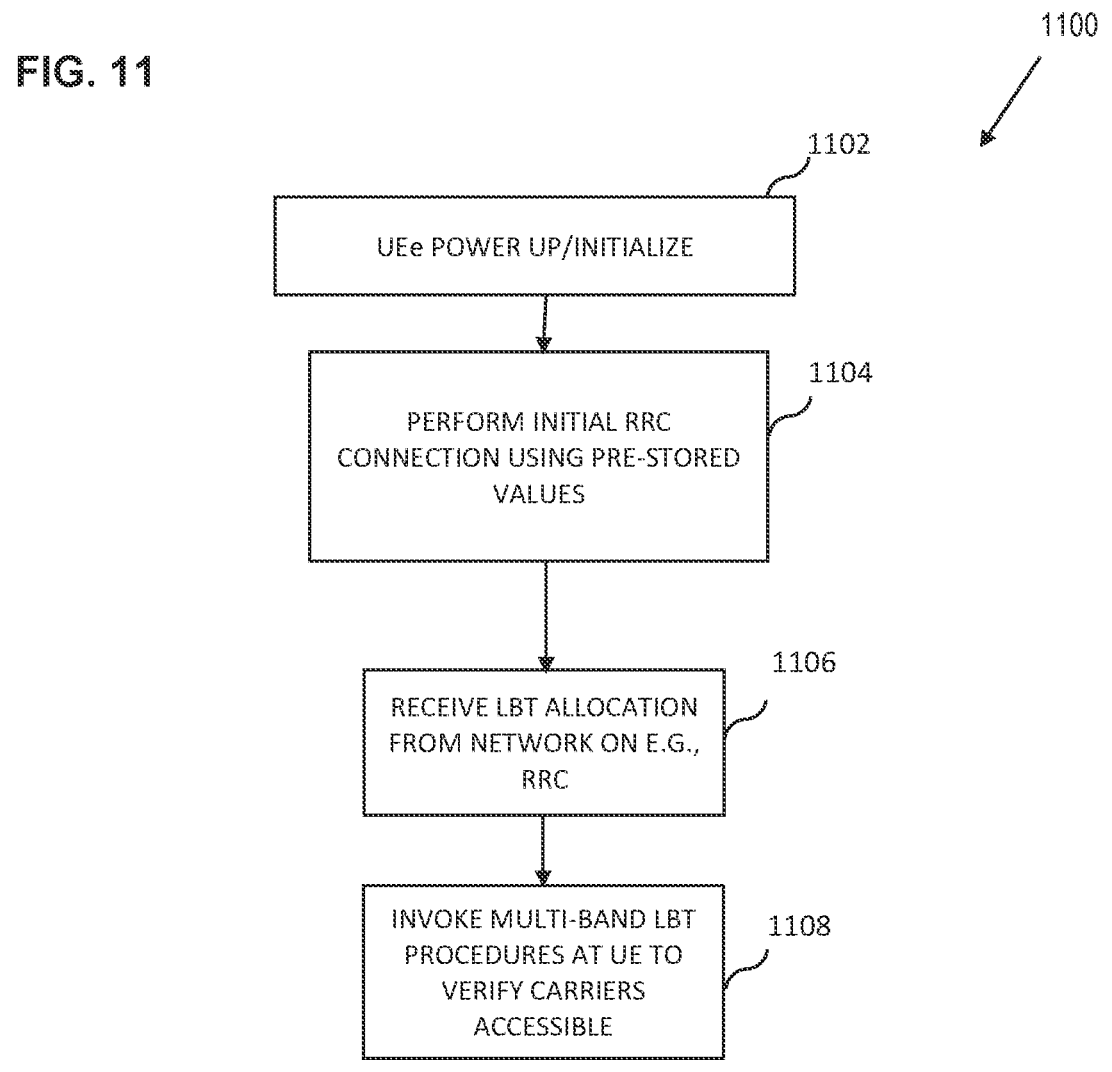

1102 UEe POWER UP/INITIALIZE

1104 PERFORM INITIAL RRC CONNECTION USING PRE-STORED VALUES

1106 RECEIVE LBT ALLOCATION FROM NETWORK ON E.G., RRC

1108 INVOKE MULTI-BAND LBT PROCEDURES AT UE TO VERIFY CARRIERS ACCESSIBLE

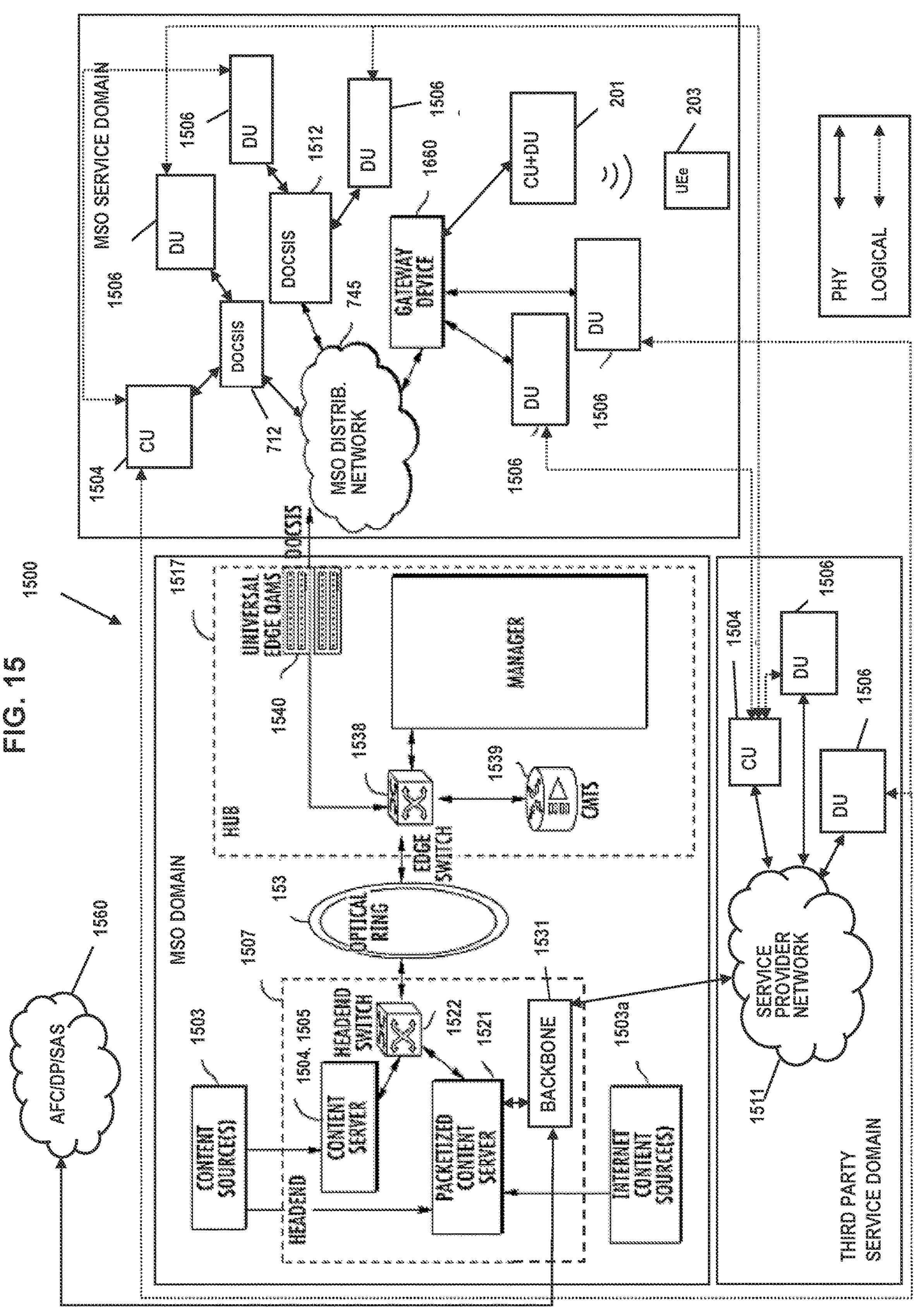

FIG. 15
1500
MSO SERVICE DOMAIN
CU
1504
DOCSIS
712
DU
1506
DOCSIS
1512
DU
MSO DISTRIB. NETWORK
745
GATEWAY DEVICE
1660
CU+DU
201
UEe
203
DOCSIS
MSO DOMAIN
HUB
1517
UNIVERSAL EDGE QAMS
1540
MANAGER
1538
EDGE SWITCH
1539
CMTS
153
OPTICAL RING
1507
HEADEND
HEADEND SWITCH
1522
1521
BACKBONE
1531
CONTENT SOURCE(S)
1503
CONTENT SERVER
1504, 1505
PACKETIZED CONTENT SERVER
INTERNET CONTENT SOURCE(S)
1503a
AFC/DP/SAS
1560
SERVICE PROVIDER NETWORK
1511
THIRD PARTY SERVICE DOMAIN
PHY
LOGICAL

APPARATUS AND METHODS FOR MULTICARRIER UNLICENSED HETEROGENEOUS CHANNEL ACCESS

PRIORITY

This application is a continuation of, and claims priority to, co-owned and co-pending U.S. patent application Ser. No. 16/567,509 of the same title filed on Sep. 11, 2019, and issuing as U.S. Pat. No. 11,528,748 on Dec. 13, 2022, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1 Technological Field

The present disclosure relates generally to the field of wireless devices and networks thereof, and specifically in one exemplary aspect provides channel access mechanisms for a radio network utilizing unlicensed spectrum.

2. DESCRIPTION OF RELATED TECHNOLOGY

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE).<br>1900 MHz PCS, Band 2 (GSM/GPRS/EDGE).<br>850 MHz Cellular, Band 5 (UMTS/HSPA+ up to 21 Mbit/s).<br>1900 MHz PCS, Band 2 (UMTS/HSPA+ up to 21 Mbit/s). |
| 4G | 700 MHz Lower B/C, Band 12/17 (LTE).<br>850 MHz Cellular, Band 5 (LTE).<br>1700/2100 MHz AWS, Band 4 (LTE).<br>1900 MHz PCS, Band 2 (LTE).<br>2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

5G New Radio (NR) and NG-RAN (Next Generation Radio Area Network) NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, Release 16 NG-RAN leverages technology and functions of extant LTE/LTE-A technologies (colloquially referred to as 4G, 5G), as bases for further functional development and capabilities. For instance, one of the salient features of LTE-A is extending LTE into the 5G GHz unlicensed spectrum, comprising the spectrum between 5150 MHz and 5995 MHz. In addition, the 5 GHz band, is currently utilized by the recent WLAN technologies, which is referred to 802.11n/ax/ax. LTE-A Release 10 specification 3GPP TR 36.808 introduced carrier aggregation (in other words, multi-carrier operation), in order to increase the bandwidth, and thereby throughput. Since it is important to keep backward compatibility with release 8 and 9, the aggregation is based on the release 8 and 9 carriers; see inter alia entitled "3rd Generation Partnership Project; Technical Specification Group Radio Access Network; Evolved Universal Terrestrial Radio Access Network (E-UTRAN); Carrier Aggregation (Release 10)" dated August 2010, which is incorporated herein in its entirely.

As described in 3GPP TR 36.808 and generally shown in FIG. 1 herein, the LTE-A User Equipment (UE) 103 can be allocated on multiple carriers on both Downlink (DL) 105 and uplink (UL) 107. Each aggregated carrier is referred to as a component carrier (CC). The component carrier can have bandwidth of 1.4, 3, 5, 10, 15 or 20 MHz, and a maximum of five aggregated carriers can be supported between the UE and the base station 101 (e.g., 3GPP eNB or gNB). Hence, the maximum aggregated bandwidth is 100 MHz. The individual component carriers can also have different bandwidth. See FIG. 1 herein.

3GPP TS 36.212 defines the Random-Access Channel (RACH) procedure for LTE and LTE-A. When a UE is switched on for the very first time, it will start searching the network and the available frequency band. There is a possibility that there are many frequency bands from different networks to which the UE can connect. Therefore, a UE synchronizes to the network through the established RACH protocol. Each UE sends a specific preamble on the RACH to the network. If two UEs use the same RACH simultaneously, then there can be a collision. 3GPP TS 36.212 defines 64 different preambles pattern available to UE, and UE can decide which of them to use randomly. If the UE transmission is successful, an eNB sends "Random Access Response" to the UE on the DL-SCH (Downlink Shared Channel), and grants the UE network access and allocates frequency spectrum to the UE.

Similar to the above-described RACH procedure, when a 5G NR/NG-RAN radio initially connects to a 5G NR/NG-RAN network, it uses a random access protocol. Specifically, in 5G NR/NG-RAN, initial accesses generally resemble a standard procedure that a legacy LTE relies upon. However, regarding specifically how the initial access is performed, 5G NR/NG-RAN differs from the legacy LTE operation significantly. In the legacy LTE implementation, the synchronization signals are transmitted by using omni-directional antennas, while 5G NR/NG-RAN and NR/NG gNB employs beam sweeping and management when transmitting the synchronization signals. At the beginning of the 5G random access procedure, both the UE and the gNB are not aware of the appropriate beam directions; hence, initial synchronization signals may be sent with multiple beam sweeping. After detecting the initial synchronization signals, the UE selects the best gNB beam for further DL acquisition. The gNB also utilizes multiple Rx beams, since the position of the UE is unknown. The gNB provides multiple RACH resources to the UE, and applies one Rx beam per each RACH resource.

Unlicensed Multi-Carrier Operation and Issues—

Due to the carrier aggregation capability in LTE as discussed above, carriers want to expand usage of unlicensed spectrum with use of LTE technology. Multi-carrier operation in unlicensed spectrum is supported for both LTE-unlicensed technologies (e.g., as LAA, or MulteFire in 5 GHZ), as well as IEEE 802.11n/ac/ax (Wi-Fi in 2.4 GHz/5 GHz) and IEEE 802.11ad/ay (60 GHz). At a high level, each technology follows a particular multi-carrier channel access procedure with respect to the set of DL or UL carriers targeted for transmission.

For example, in the case of the aforementioned IEEE-Std. 80211 technologies, a dual energy-detection plus preamble-detection approach is adopted on each carrier within the set of multiple candidate carriers. Furthermore, 802.11ax APs can aggregate the 5 GHz and 2.4 GHz bands, but the same channel access mechanism is used for each band.

In the case of LAA and MulteFire, energy detection is utilized on each carrier.

However, in all cases, the multi-carrier channel access mechanism is homogeneous; i.e., the channel access procedure on each carrier is essentially the same.

3GPP TR 38.889 3GPP V16.0.0 (2018 December) entitled "Technical Report-3rd Generation Partnership Project; Technical Specification Group Radio Access Network;

Study on NR-based access to unlicensed spectrum (Release 16)," incorporated herein by reference in its entirety, discusses LBT mechanisms and requirements for NR-U. Notably, in Release 16, 5G NR-U is considering use of multi-carrier operation within sub-7 GHz unlicensed spectrum. However, in the event that an NR-U node aggregates carriers from 5 Ghz and 6 GHz unlicensed bands, the aforementioned homogeneous channel access mechanisms may not be suitable, based on inter alia, different regulatory requirements or coexistence criterion in these different bands. For example: (i) NR-U may require performance of LBT (Listen Before Talk) protocols to gain access to physical medium for transmission per TS 38.889 (or TS 37.213 for LTE-LAA); and (ii) mechanisms for accounting for transmission failures, and implement resulting exponential back-off mechanisms, etc. may differ.

As such, no viable multi-carrier channel utilization or aggregation mechanism exists within unlicensed spectrum which can reconcile different channel access mechanisms which may be adopted for subsets of the carrier beings aggregated. According, improved apparatus and methods are needed to provide multi-carrier channel access within such heterogeneous environments so as to enable, inter alia, increased unlicensed band throughput through carrier aggregation or other multi-carrier use techniques.

SUMMARY

The present disclosure addresses the foregoing needs by providing, inter alia, apparatus and methods for enhanced multicarrier channel access mechanisms in unlicensed frequency bands.

In a first aspect, a method of operating a wireless network having at least one wireless access node is disclosed. In one embodiment, the method includes: utilizing a first carrier within a first unlicensed frequency band for transmission of at least a first portion of user data between the at least one wireless access node and a wireless user device; and simultaneously utilizing a second carrier within a second unlicensed frequency band for transmission of at least a second portion of the user data between the at least one wireless access node and the wireless user device.

In one variant, the first and second unlicensed frequency bands utilize heterogeneous carrier access mechanisms.

In another variant, the at least one wireless access node comprises a NR (New Radio)-compliant distributed unit (DU); and the simultaneously utilizing comprises coordinating transmission of the at least first portion and second portion of the user data with the wireless user device.

In a further variant, the utilizing the first carrier and simultaneously using the second carrier comprises scanning at least each of the first and second carriers using respective different ones of scan mechanisms.

In another variant, the scanning at least each of the first and second carriers using respective different ones of scan mechanisms includes: scanning at least first and second frequency bands containing the first and second carriers and each band containing a plurality of other carriers, respectively; and selecting at least the first and second carriers for said utilizing from their respective pluralities of other carriers. In one implementation, the selecting at least the first and second carriers for said utilizing from their respective pluralities of other carriers includes: selecting the first carrier and at least one other carrier within the first frequency band; selecting the second carrier and at least one other carrier within the second frequency band; aggregating (i) the first carrier and the at least one other carrier within the first frequency band with (ii) the second carrier and the at least one other carrier within the second frequency band; and utilizing the first carrier and the utilizing the second carrier in aggregation.

In yet another variant, the utilizing the first carrier and simultaneously using the second carrier includes accessing at least each of the first and second carriers using respective different ones of access mechanisms. In one implementation, the accessing at least each of the first and second carriers using respective different ones of access mechanisms includes using respective first and second LBT (Listen Before Talk)-based procedures.

In still a further variant, the utilizing the first carrier and simultaneously using the second carrier includes transmitting at least one of 3GPP PDCCH control data or PDSCH user plane data on each of the first carrier and second carrier.

In another aspect, a computerized network apparatus for use in a wireless infrastructure is disclosed. In one embodiment, the computerized network apparatus includes: digital processing apparatus; at least one data network interface in data communication with the digital processing apparatus; and a storage device in data communication with the digital processing apparatus, the storage device comprising a storage medium having at least one computer program.

In one variant, the at least one computer program is configured to, when executed on the digital processing apparatus, cause the computerized network apparatus to: utilize a first medium access protocol for determining an availability of a first unlicensed frequency band; utilize a second medium access protocol for determining an availability of a second unlicensed frequency band, the second unlicensed frequency band having access requirements different from those of the first unlicensed frequency band; and based on the determination of the availability of the first unlicensed frequency band and the determination of the availability of the second unlicensed frequency band, cause utilization of both bands simultaneously in an aggregation.

In another variant, the utilization of both bands simultaneously in an aggregation includes utilization of the first unlicensed frequency band independently of utilization of the second unlicensed frequency band to transact data with a common user device.

In a further variant, the computerized network apparatus includes a 5G NR-U capable gNodeB, and the first and second unlicensed frequency bands comprise a 5 GHz band and 6 GHz band, respectively.

In yet a further variant, the first medium access protocol includes an energy detection protocol, and the second access protocol includes a preamble detection protocol.

In another aspect, a method of operating a wireless network node is disclosed. In one embodiment, the method includes: determining a need for multiple band operation; based at least on the determination, accessing a cognizant network entity for an allocation of one or more carriers within a first of the multiple bands; performing an LBT-based medium access protocol on at least a second of the multiple bands to identify at least one carrier available for use therein; and utilizing at least the allocated one or more carriers in the first band and the identified at least one carrier in the second band to transact data with a wireless client device.

In one variant, the method further includes performing an LBT-based medium access protocol on at least the allocated one or more carriers to verify availability thereof before said utilizing. In one implementation, the LBT-based medium access protocol performed on at least the allocated one or more carriers to verify availability thereof includes an LBT-based protocol different than that of the LBT-based medium access protocol performed on the at least second band.

In a further aspect, a method for providing multi-carrier utilization in unlicensed frequency band is disclosed. In one embodiment, the method includes: measuring a first set of channel sensing parameters, measuring a second set of channel sensing parameters, comparing the first set of channel sensing parameters with a first set of thresholds, comparing the second set of channel sensing parameters with a second set of thresholds; based on the measurement of the first set, determining the availability of the first frequency band; based on the measurement of the second set, determining the availability of the second frequency band; and transmitting a communication message in at least one of the first and the second frequency bands.

In one variant, a 5G NR-U unlicensed device (e.g. gNB and/or UE) operating across unlicensed frequency band is utilized. In one implementation, the 5G NR-U device performs Listen Before Talk (LBT) procedures to determine the availability of the two aforementioned frequency bands.

In another aspect of disclosure, a 3GPP xNB (e.g., 4.5G and/or 5G) is disclosed. In one embodiment, the gNB includes: a receiver module, a transmitter module, a first channel access module LBT A, a second channel access module LBT B, and a channel sensing module. In one variant, the gNB may further include: a processor apparatus; a wireless modem chipset in data communication with processor apparatus; a program memory in data communication with processor apparatus; an RF front end module; a local database; and a network interface module in data communication with a core network. In further implementation, the program memory includes at least one program which is configured to, when executed to the processor apparatus, causes transmission of a communication signal on a first and/or second frequency band.

In another aspect of disclosure, a 3GPP UE (e.g., 4.5G and/or 5G) is disclosed. In one embodiment, the UE includes: a receiver module, a transmitter module, a first channel access module LBT A, a second channel access module LBT B; and a channel sensing module. In one variant, the UE may further include: a processor apparatus; a wireless modem chipset in data communication with processor apparatus; a program memory in data communication with processor apparatus; a mass storage; and an RF front end module. In further implementation, the program memory includes at least one program which is configured to, when executed to the processor apparatus, causes transmission of a communication signal on a first and/or second frequency band.

In another aspect of disclosure, computer readable apparatus is disclosed. In one embodiment, the apparatus includes a storage medium configured to store one or more computer program. In embodiment, the apparatus includes a program memory or HDD or SDD on a computerized controller device, such as MSO controller. In another embodiment, the apparatus includes a program memory, HDD or SDD on a computerized access node (e.g. gNB or UE).

These and other aspects shall become apparent when considered in light of the disclosure provided herein.

BRIEF DESCRIPTION OF THE DRAWINGS

FIG. 7B is logic flow diagram illustrating a further exemplary implementation of the LBT procedures of FIG. 7.

FIG. 11 is logic flow diagram illustrating an exemplary method for channel access in unlicensed bands for use in a UE.

FIG. 15 is a functional block diagram illustrating an exemplary packetized network architecture useful in backhauling and supporting operation of the enhanced devices (e.g., gNBe) of the present disclosure.

Figure 1:
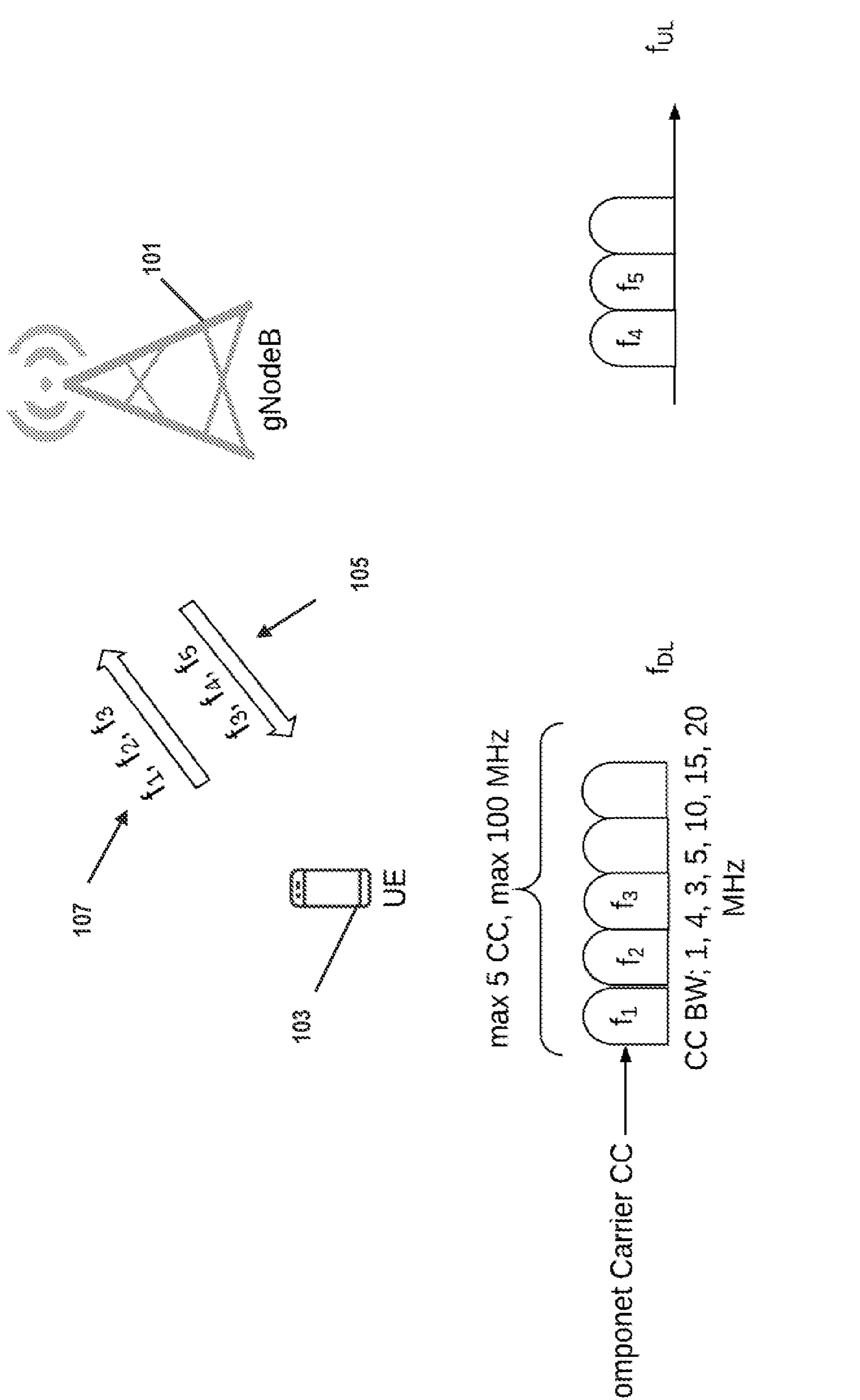
FIG. 1 is graphical illustration of one exemplary prior art approach to carrier aggregation as used in e.g., licensed LTE wireless systems.

All figures @ Copyright 2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Bro adband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VOLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein the terms "unlicensed" and "unlicensed spectrum" refer without limitation to radio frequency spectrum (e.g., from the sub-GHz range through 100 GHz) which is generally accessible, at least on a part time basis, for use by users not having an explicit license to use, such as e.g., ISM-band, 2.4 GHz bands, 5 GHz bands, 6 GHz bands, quasi-licensed spectrum such as CBRS, 60 GHz (V-Band), and others germane to the geographic region of operation (whether in the U.S. or beyond) that will be appreciated by those of ordinary skill given the present disclosure.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "xNB" refers to any 3GPP-compliant node including without limitation eNBs (eU-TRAN) and gNBs (5G NR).

Overview

In one exemplary aspect, the present disclosure provides improved architectures, methods and apparatus for providing enhanced wireless services which, inter alia, utilize multi-carrier channel access mechanisms for unlicensed spectrum, where different (heterogeneous) channel access mechanisms associated with the different carriers (or groups of carriers) may be accommodated. As such, the exemplary embodiments described herein enable, among other things, concurrent use of spectrum within different operating bands having different access mechanisms and requirements which would otherwise be irreconcilable, so at to provide enhanced bandwidth between the access node (e.g., 5g NR-U gNB) and the user device (e.g., UE).

In one embodiment, an NR-U system is described, wherein two operating frequency bands are used without having to enumerate or include specific data relating to the operating frequency bands. In one variant, an inventive NR-U access node device (gNBe) includes logic within its CU and/or DU that causes performance of multiple (e.g., two) simultaneous LBT procedures on each band, and cause contemporaneous use thereof. In one implementation, the LBT procedures include sensing one or more channel parameters for each band (which may comprise one or multiple individual carriers) to determine if the unlicensed carrier(s) is/are available for use. The LBT procedures can be heterogeneous across the two (or more) carrier/bands, including in terms of sensing parameters, protocols, and/or backoff mechanisms applied to each, consistent with the prevailing access mechanism applicable to those bands.

In other variants, an enhanced UE (UEe) is described which is configured to performs LBT procedures to identify the bands on which the NR-U devices can operate.

In yet other variants, both the UEe and gNBe may perform LBT procedures on each carrier to check the availability of the operating frequency band.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Multi-Carrier Heterogeneous Access

Figure 2:
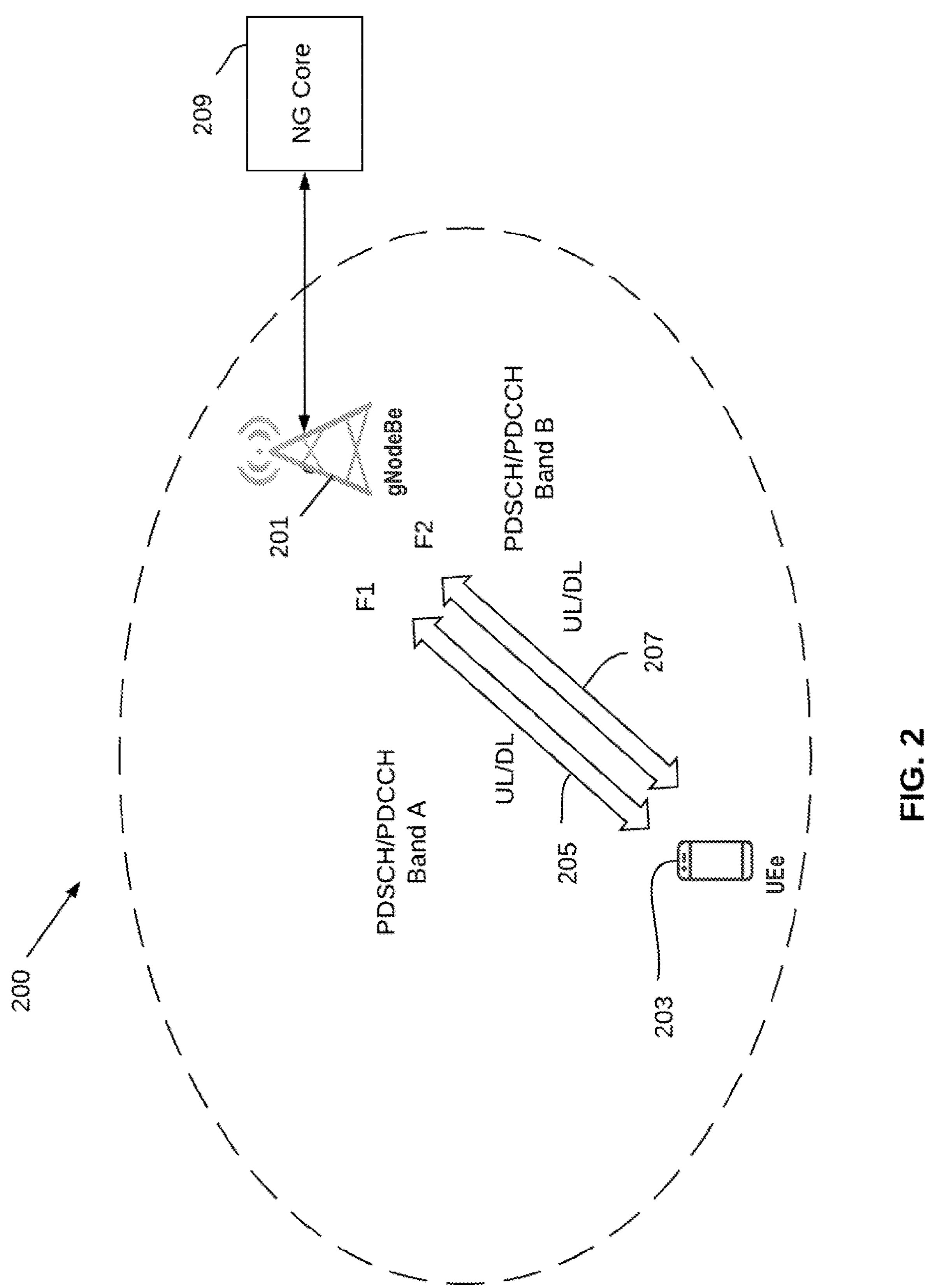
FIG. 2 is a graphical illustration of one exemplary embodiment of multi-carrier utilization according to the present disclosure.

FIG. 2 shows an example of multicarrier aggregation for LTE/LTE-A in unlicensed band in a wireless communication 200 according to one embodiment of the present disclosure. In this example, the enhanced gNB 201 (discussed in greater detail subsequently herein with respect to various ones of FIGS. 3-16) transmits OFDMA signals to the UE 203 over a DL channel 205. The UE 203 transmits SC-FDMA UL signals to the gNB 201 over a UL channel 205. The link 205 is associated with the frequency F1 (Band A) in the unlicensed spectrum. The gNB 201 may also transmit OFDM signals to the UE 203 over the DL link 207. The link 205 is associated with the frequency F2 (Band B) also within the unlicensed spectrum. The UE 203 may also transmit SC-FDMA signals to gNB 201 over the UL link 207. Notably, the two Bands (A and B) may utilize heterogeneous access mechanisms, depending on the bands chosen and their respective regulations, standards and specific implementations. For instance, in NR-U aggregation of 5 GHz and 6 GHz unlicensed bands, instances of such heterogeneity may exist. As an example, in the 5 GHz band, LBT procedures without any centralized coordination are sufficient for coexistence. In the 6 GHz band, a centralized coordination entity, known as the automatic frequency coordination (AFC) entity, may in addition dictate what subsets of the band can be used for LBT-based unlicensed access, in order to protect incumbent users from interference or achieve other goals.

As described in greater detail subsequently herein, the data and control signals may be transmitted between the gNB 201 and the UE 205 over the various links (i.e., link 205 and/or link 207). There may be instances in which either or both link 205 and 207 may be used, depending on configuration and application. The gNB 201 is communicative with a single or multiple NG Cores 209, such as that operated by an MNO or MSO. Each NG Core 209 may have multiple gNBs 201 associated therewith. See the detailed discussions of exemplary gNB and 5GC core configurations relative to FIGS. 15A-15E provided subsequently herein.

The scenario of FIG. 2 may occur with any MSO or Mobile Network Operator (MNO) that is able to operate in the unlicensed spectrum, or combination thereof (such as via MSO/MNO cooperation or infrastructure sharing agreements).

Figure 3:
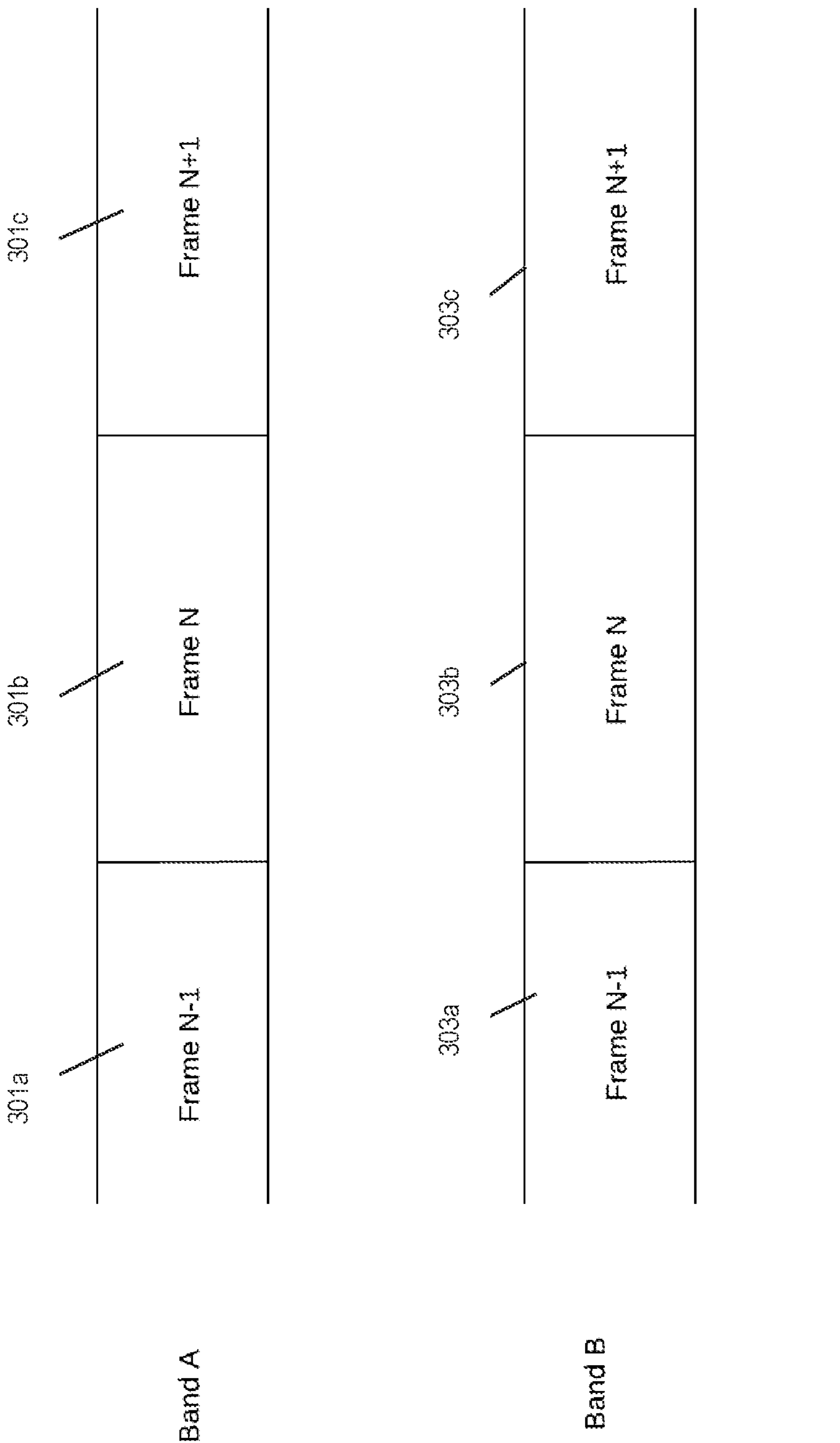
FIG. 3 is graphical representation illustrating one exemplary assignment of an 3GPP frame to two frequency bands.

FIG. 3 shows an example of frame for DL/UL transmission in an unlicensed 3GPP network. Each frame 301*a-c* and 303*a-c* includes data and control signals in the DL/UL. The first frames 301*a-c* are associated to frequency spectrum F1 (Band A), and the second frames 303*a-c* is assigned to frequency spectrum F2 (Band B). The frames 301*a-c* and 303*a-c* length are 10 ms. In some instances, the boundaries of first frames 301*a-c* are synchronized with the boundaries of second frames 303*a-c*. In some other instances, the boundaries of frames may not be synchronized with the boundaries of other frames. It will be appreciated that while cross-band frame synchronization may or may not exist, generally synchronized (simultaneous) utilization of the bands may be employed for transmission of data. In one variant, spatial diversity (e.g., MIMO) channels are assigned to each of the different bands, although this is not a requirement.

Figure 4:
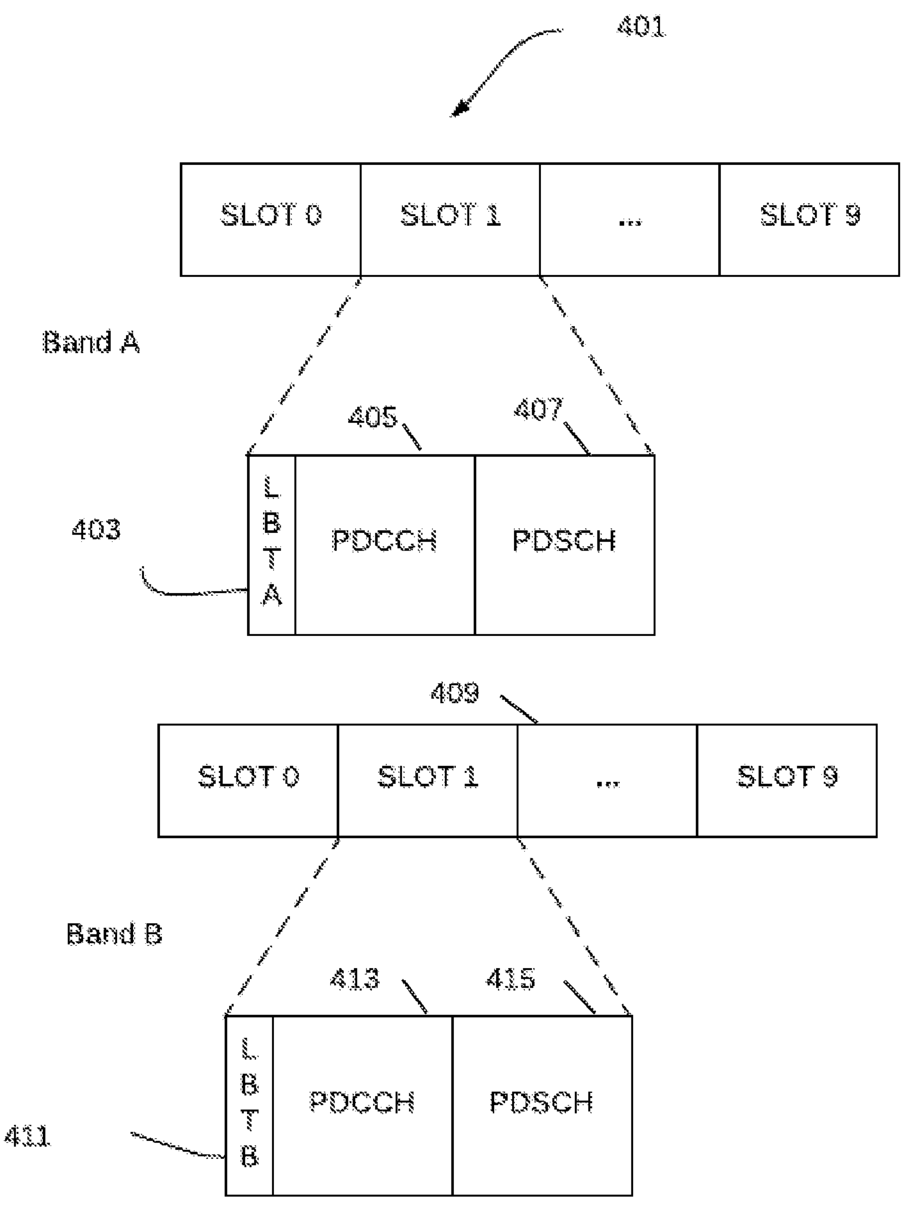
FIG. 4 is graphical representation illustrating an example of 3GPP frame and control data transmission using two frequency bands.

FIG. 4 shows an example of a 3GPP frame structure in unlicensed Bands A and B. A first frame 401 is an example of a frame associated to the frequency Band A in a periodic 3GPP (e.g., NR) radio frame transmission, and the second frame 409 is associated to the frequency Band B in a periodic NR radio frame transmission. Radio frames 401, 409 are 10 ms long and consist of 10 slots. Each slot length is 1 ms, and maybe used for DL or UL. The control signals for the frame 401 are transmitted through Physical Dedicated Control Channel (PDCCH) 405. The data signals for the first frame 401 are transmitted through Physical Dedicated Shared Channel (PDSCH) 407. The LBT procedure 403 are used to request LBT access on unlicensed frequency Band A. The control signals for the second frame 409 are transmitted through Physical Dedicated Control Channel (PDCCH) 413. The data signals for the second frame 409 are transmitted through Physical Dedicated Shared Channel (PDSCH) 415. The LBT procedure 411 are used to request LBT access on the unlicensed frequency Band B.

Figure 5A:
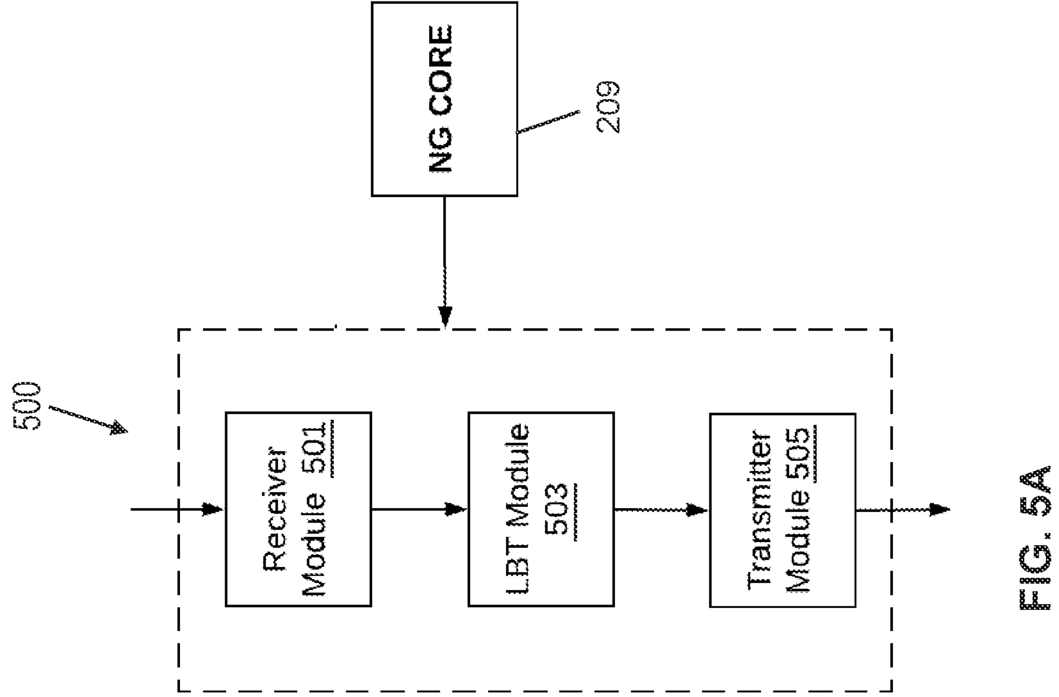
FIG. 5A is a conceptual block diagram illustrating an embodiment of a generalized xNB architecture according to the present disclosure.

Referring to FIG. 5A, one embodiment of a wireless device 500 architected for use in a 5G unlicensed wireless communication system is shown and described. In one example, the device 500 may be a 5G gNB base station such as the gNBe 201 of FIG. 2. Within the generalized architecture of FIG. 5A, the device 500 includes a receiver module 501, an unlicensed LBT module 503, and a transmitter module 505. These components are communicative with each other, such as in e.g., a transceiver configured with the LBT module logic operative to interact therewith (see FIG. 16).

The components of the device 500 may be individually or partially implemented in software, firmware or hardware. The receiver module 501 may include a radio frequency (RF) receiver to operate in unlicensed spectrum. The receiver module 501 may be used to receive data and control signals over the wireless communications links 205 and/or 207 (FIG. 2) using the frame structures 300 and 400 with reference to FIGS. 3 and 4. The transmitter module 505 may include a radio frequency (RF) receiver to operate in the unlicensed spectrum, and may be integrated with the receiver module 501. The transmitter module 505 may be used to transmit data and control signals over the wireless communications links 205 and/or 207 using frame structures 300 and 400 with reference to FIGS. 3 and 4.

Figure 5B:
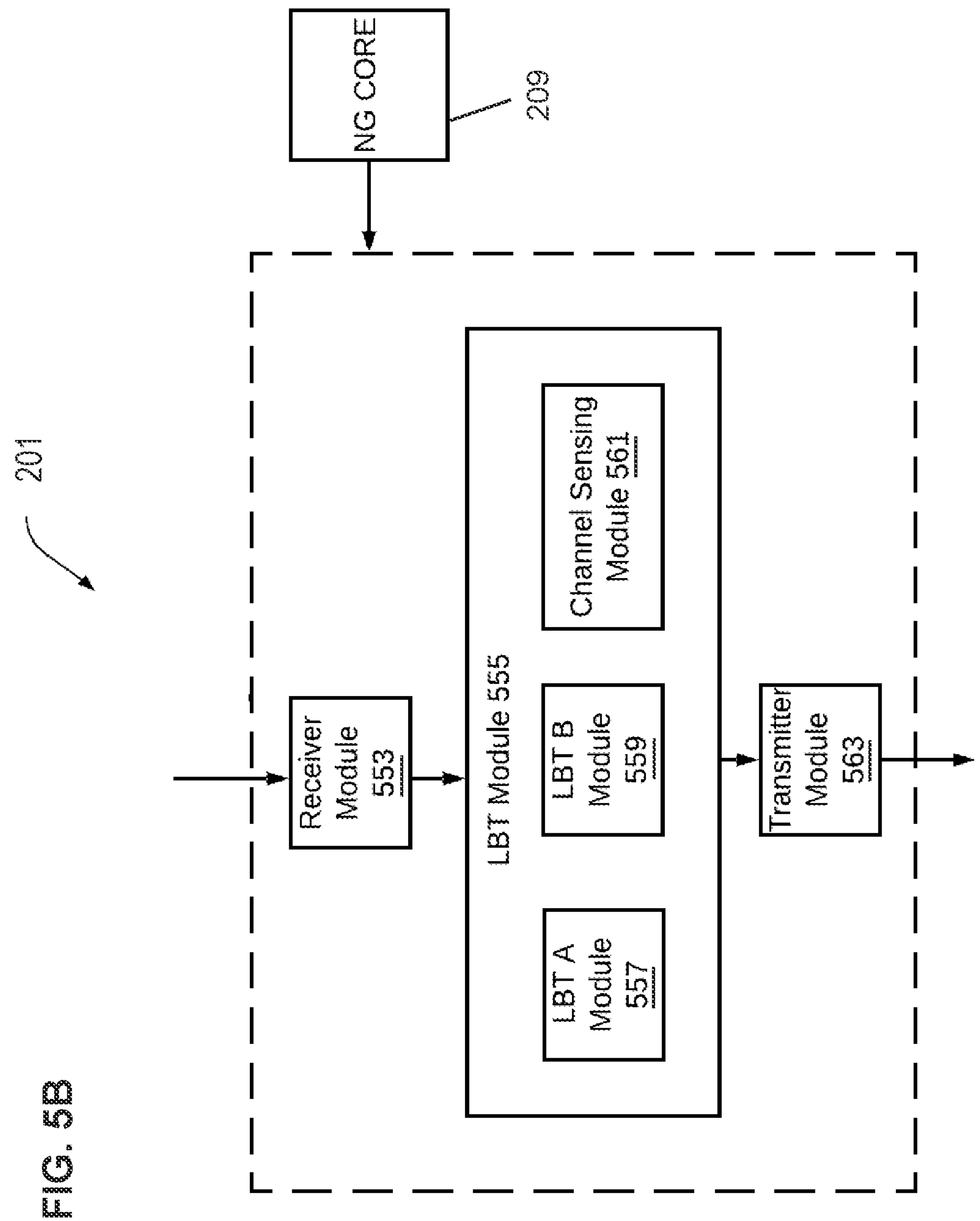
FIG. 5B is a conceptual block diagram illustrating an implementation of the xNB architecture of FIG. 5A, showing one configuration of the LBT module thereof.

FIG. 5B illustrates one embodiment of the generalized wireless device 500 of FIG. 5A. In this embodiment, the device 550 is configured for use in 5G unlicensed wireless (e.g., 5G NR-U) communication systems. The device 550 may include a receiver module 553, an LBT module 555, and a transmitter module 563. The components of the illustrated device 550 may be individually or partially implemented in software, firmware or hardware. The receiver module 553 may include a radio frequency (RF) receiver to operate in unlicensed spectrum (e.g., NR-U bands or other). The receiver module 553 may be used to receive data and control signals over the wireless communications links 205 and/or 207 using frame structures 300 and 400 with reference to FIGS. 3 and 4. The transmitter module 563 may include a radio frequency (RF) receiver to operate in the unlicensed spectrum. The transmitter module 563 may be used to transmit data and control signals over the wireless communications links 205 and/or 207 using for instance the frame structures 300 and 400 with reference to FIGS. 3 and 4. As with the configuration of FIG. 5A, the receiver and transmitter modules may be aggregated into a transceiver.

The LBT module 555 in this configuration includes an LBT "A" module 557, an LBT "B" module 559, and a channel sensing module 561. The LBT A module may perform an LBT protocol to determine availability of the unlicensed spectrum (e.g., one or more carriers) in frequency Band A. The LBT B module may perform a similar LBT protocol to determine the availability of the unlicensed spectrum in frequency Band B.

The channel sensing module 561 is configured to measure N different parameters {a1,a2, . . . ,aN} and {b1,b2, . . . ,bN} for Band Aand B, respectively. The channel sensing module 561 compares the measured parameters {a1,a2, . . . ,aN} and {b1,b2, . . . ,bN} to e.g., predetermined threshold values {ta1,ta2, . . . ,taN} and {tb1,tb2, . . . ,tbN} respectively, and determines whether any other device (e.g., UE or gNB) is transmitting on either of the frequency Bands A and B or not. If the channel sensing module 561 determines that either frequency band A and/or B is available, the transmitter module 563 may then initiate a transmission (or not), depending on the utilization logic applied (e.g., whether two or more carriers must be available before transmission is commenced, etc.).

Figure 6A:
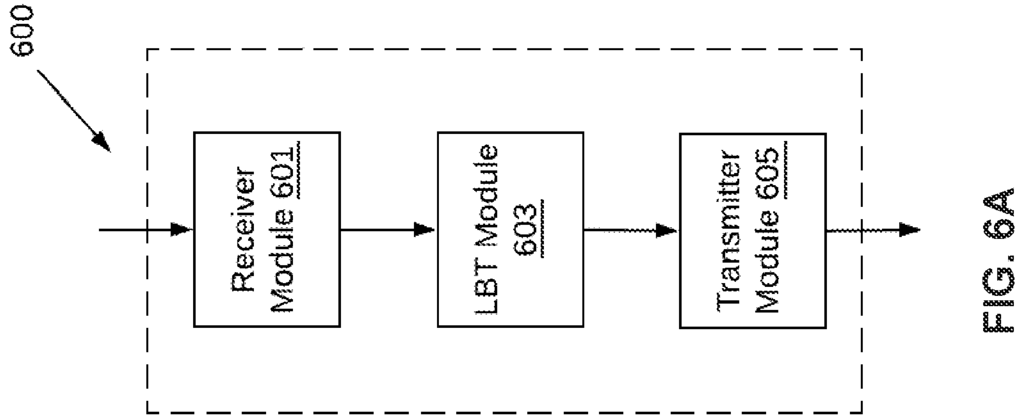
FIG. 6A is a functional block diagram illustrating an embodiment of a UE architecture according to the present disclosure.

FIG. 6A illustrates a generalized configuration of a device 600 for use in a 5G UEe according to the present disclosure. The UEe device 600 includes a receiver module 601, an unlicensed LBT module 603, and a transmitter module 605.

As with the gNBe of FIG. 5A, the components of the UEe device 600 may be individually or partially implemented in software, firmware or hardware. The receiver module 601 includes a radio frequency (RF) receiver configured to operate within unlicensed spectrum. The receiver module 601 may be used to receive data and control signals over the wireless communications links 205 and/or 207 (FIG. 2) using frame structures 300 and 400 with reference to FIGS. 3 and 4. The transmitter module 605 includes a radio frequency (RF) receiver configured to operate within unlicensed spectrum. The transmitter module 605 may be used to transmit data and control signals over the wireless communications links 205 and/or 207 using e.g., the frame structures 300 and 400 with reference to FIGS. 3 and 4.

Figure 6B:
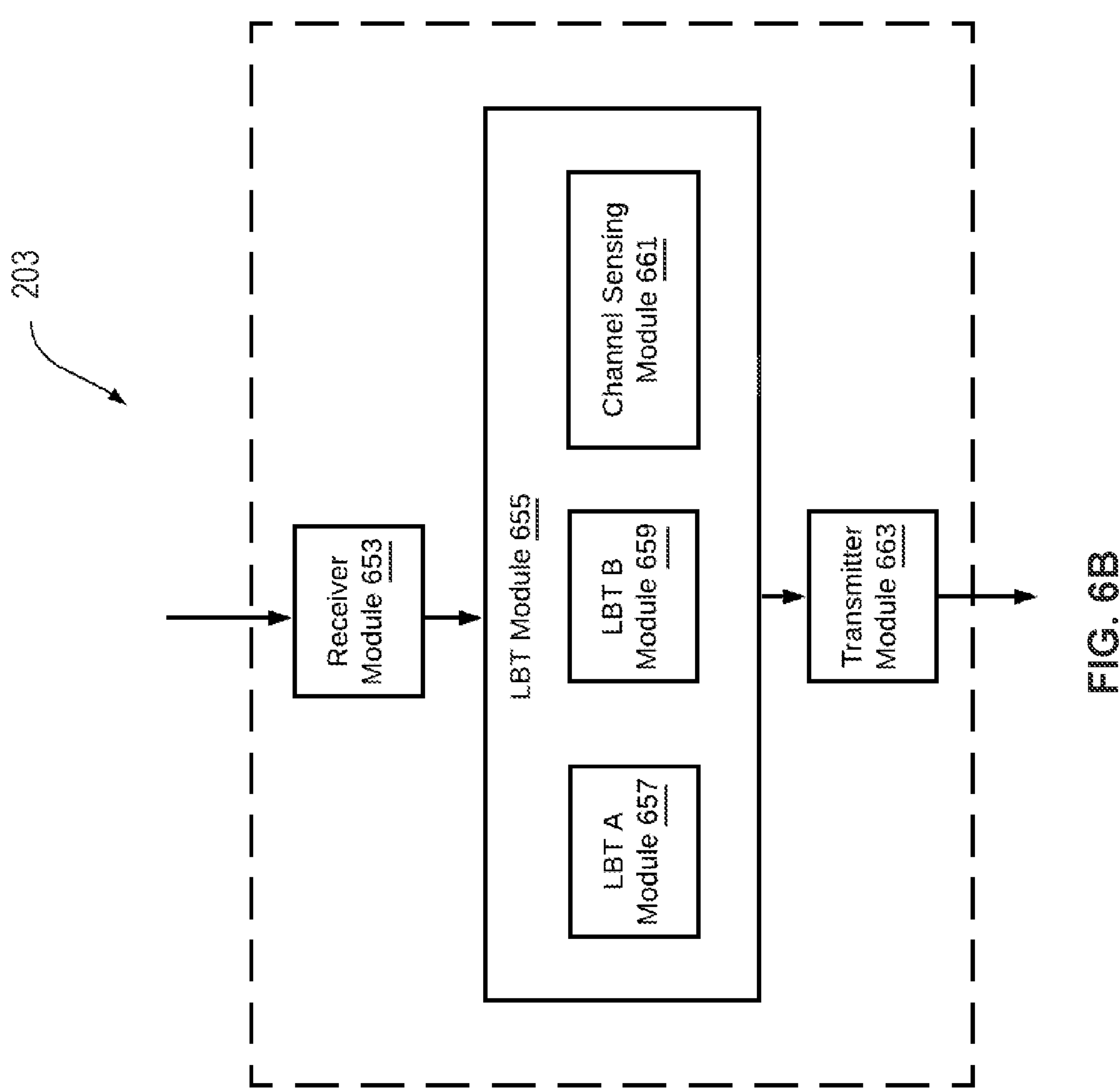
FIG. 6B is a functional block diagram illustrating an implementation of a UE architecture according to the present disclosure.

Referring to FIG. 6B, one embodiment of a UEe device 653 for use in 5G unlicensed wireless communication systems is shown, based on the generalized configuration of FIG. 6A. The UEe device 653 includes a receiver module 653, an LBT module 655, and a transmitter module 663. As above, the components of the UEe device 653 may be individually or partially implemented in software, firmware or hardware. The receiver module 653 includes a radio frequency (RF) receiver configured to operate within the unlicensed spectrum. The receiver module 653 may be used to receive data and control signals over the wireless communications links 205 and/or 207 using the frame structures 300 and 400 with reference to FIGS. 3 and 4. The transmitter module 663 include a radio frequency (RF) receiver configured to operate within unlicensed spectrum. The transmitter module 663 may be used to transmit data and control signals over the wireless communications links 205 and/or 207, e.g., using the frame structures 300 and 400 with reference to FIGS. 3 and 4.

The LBT module 655 of the illustrated UEe 650 includes an LBT A module 657, an LBT B module 659, and a channel sensing module 661. LBT A module may perform an LBT protocol as described elsewhere herein to determine an availability of one or more carriers in the unlicensed spectrum in frequency Band A. Similarly, the LBT B module may perform the LBT protocol to determine availability of the unlicensed spectrum in frequency Band B. The channel sensing module 661 may measure N different parameters {a1,a2, . . . ,aN} and {b1,b2, . . . ,bN} for Bands A and B, respectively.

The module 655 may compare the measured parameters {a1,a2, . . . , aN} and {b1,b2, . . . ,bN} to predetermined threshold values {ta1,ta2, . . . ,taN} and {tb1,tb2, . . . ,tbN} respectively, and determine that whether any other device is transmitting on the frequency Bands A and B. If the channel sensing module determines that either frequency Band A and/or B is available, the transmitter module 663 may then initiate a transmission subject to its utilization logic.

Figures 6C, 6D:
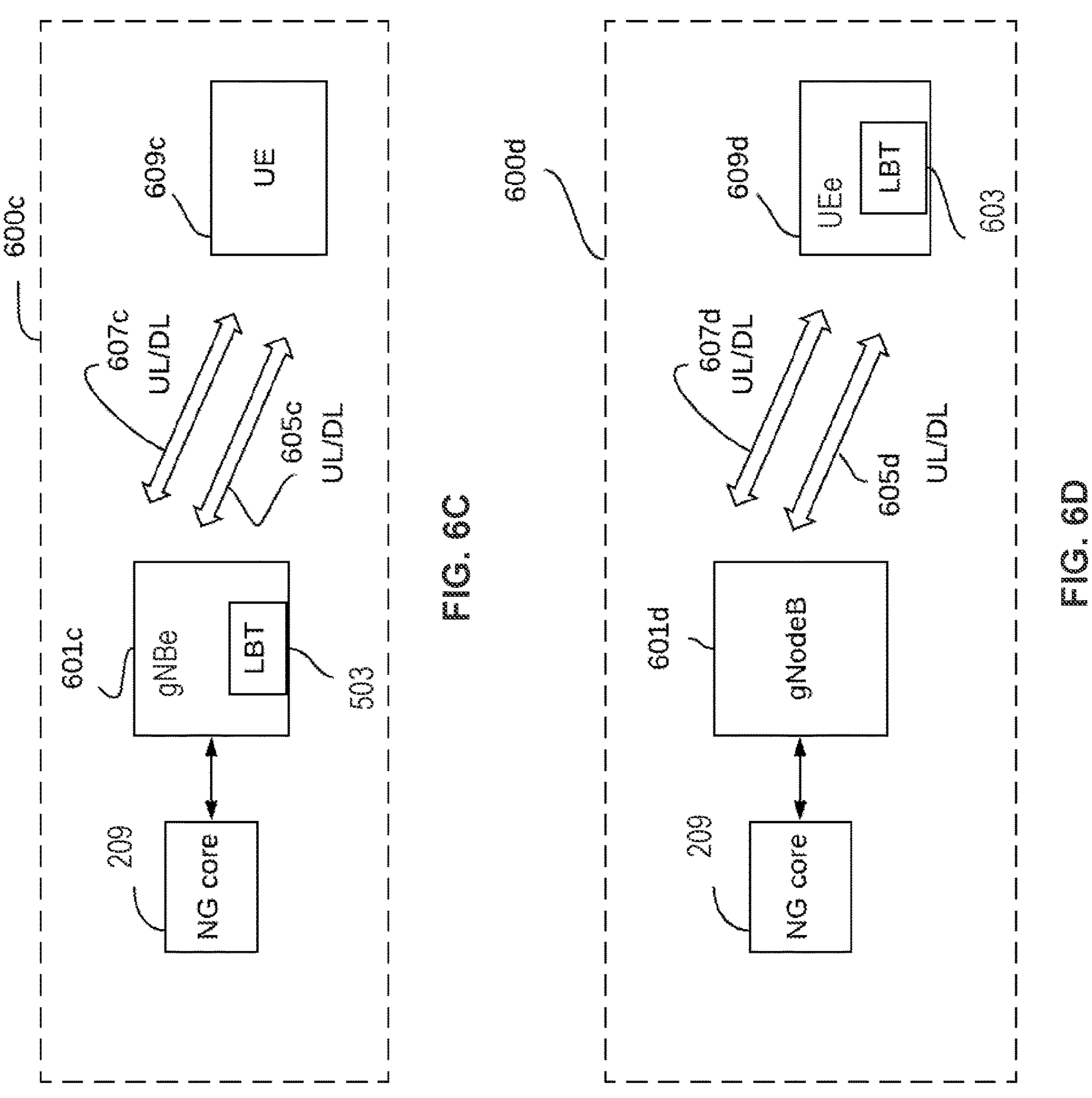
FIGS. 6C-6D are functional block diagrams illustrating an implementation of channel access mechanisms in a gNb or a UE according to the present disclosure.
Figure 6E:
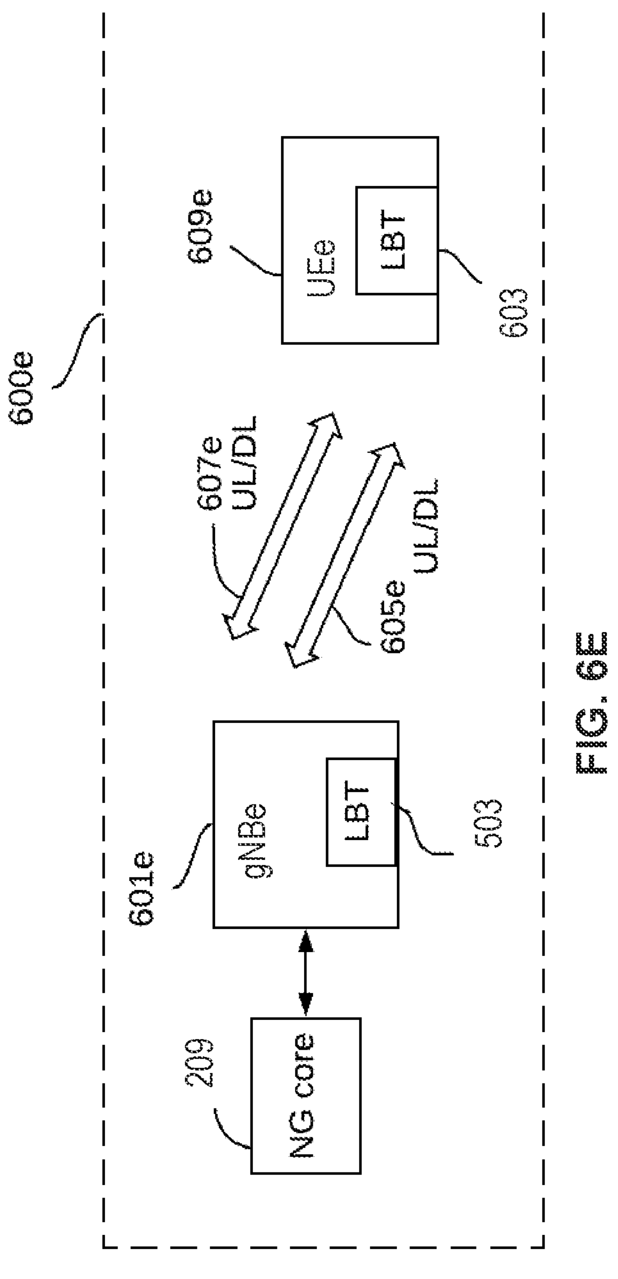
FIG. 6E is a functional block diagram illustrating an implementation of channel access mechanism in a gNB and a UE according to the present disclosure.

FIGS. 6C-6E illustrate various embodiments of the disclosed gNB-UE architectures in a wireless 5G wireless network according to the present disclosure. In these various illustrated architectures, either or both the gNB and UE may be "enhanced" (i.e., include the LBT carrier utilization logic described herein) depending on the desired configuration.

As shown, the gNB 601*c*-601*e* may transmit control and data signals over the DL channels 605*c*-605*e* and/or 607*c*-607*e* to the UE 609*c*-609*e*. The UE 609*c*-609*e* may likewise transmit control and data signals over the UL channels 605*c*-605*e* and/or 607*c*-607*e* to the gNB 601*c*-601*e*. The gNB 601*c*-601*e* may also receive control and data signals over the UL channels 605*c*-605*e* and/or 607*c*-607*e* from the UE. The UE 609*d*-609*e* may also receive control and data signals over the UL channel 605*c*-605*e* and/or 607*c*-607*e* from the gNB, which may or may not be the same channels depending on configuration.

As described in greater detail subsequently herein with respect to FIGS. 15B-15D, the LBT logic modules of the gNBe 5033 may be implemented in the CUe and/or the DUes of the gNBe. In the architecture of FIG. 6C, the LBT module 503 is implemented in a 5G gNBe only (and not the UE).

In the architecture of FIG. 6D, the LBT module 603 is implemented in a 5G UEe. In the architecture of FIG. 6E, the LBT module is implemented in both a 5G gNBe and UEe.

Referring to FIGS. 6C-6D, it is assumed that according to one scheme of utilization logic, transmission on Band A and Band B starts as soon as any of the two bands becomes available (e.g., at least one heterogeneous carrier is available). For example, if LBT A 557 (FIG. 5B) determines the availability of Band A, the gNBe can start transmitting data and control signals on Band A.

However, in other utilization schemes, simultaneous transmission in both frequency bands may be considered as a gating criterion, such as where two or more carriers must be available for "heterogeneous aggregation" before transmission may begin.

Yet other schemes will be appreciated by those of ordinary skill given the present disclosure, such as to simplify RF hardware complexity. For example, if LBT A has completed its evaluation of carrier availability before LBT B, LBT A may transmit an initial signal (e.g., preamble or other) to occupy Band A until LBT B has completed its evaluation, and vice versa. Once both LBT A and LBT B have completed evaluation and both bands are available, the data and control signals can be transmitted simultaneously on the both bands in heterogeneous aggregation form.

It will also be appreciated that while the foregoing embodiments describe evaluation and utilization (including in some scenarios aggregation) of two (2) heterogeneous carriers (e.g., Bands A and B), the principles of the present disclosure may readily be extended to: (i) blocks of carriers; e.g., where Band A and B are comprised of multiple individual carriers or sub-carriers which may be treated as a whole by one of the LBT A/B logic block described above (e.g., the entire block or range of carriers/sub-carriers within the band is evaluated, such as via wideband scan or evaluation of a 100 MHz-wide NR band comprised of 5 20 MHz LTE bands); and (ii) multiple Bands/individual carriers in excess of two (e.g., Bands A, B . . . N).

Methodology

Figure 7:
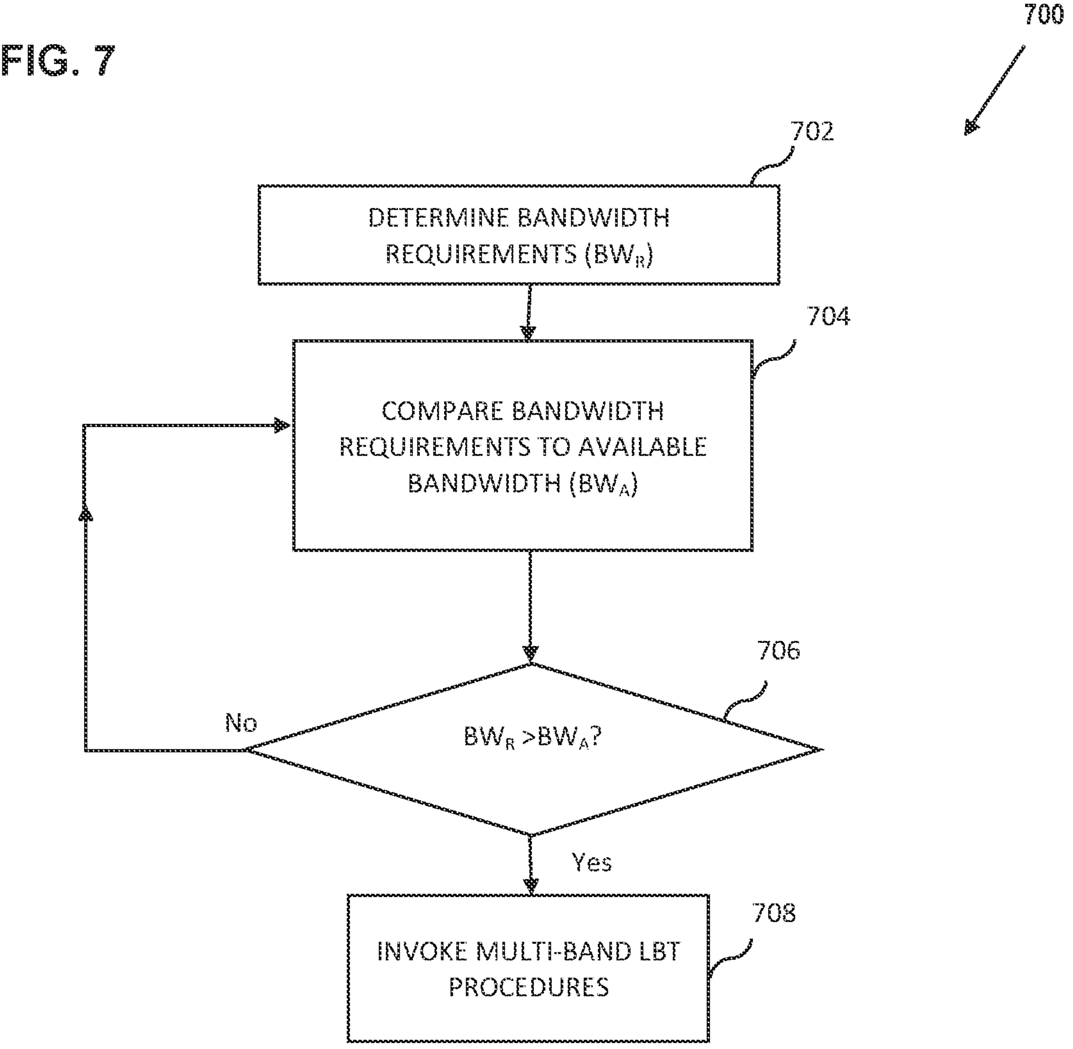
FIG. 7 is logic flow diagram illustrating an exemplary method for channel access in unlicensed bands for use in a gNB.

FIG. 7 is a flowchart illustrating an exemplary embodiment of a generalized method 700 for unlicensed channel access according to the present disclosure. This methodology is described in the exemplary context of the unlicensed channel access procedure referenced herein, although it will be appreciated that it may be adapted to other procedures and applications by those of ordinary skill given the present disclosure. The method 700 is described with reference to the exemplary gNBe 201 of FIG. 2, although it may be practiced by other entities (such as e.g., a 5GC-based or MSO core-based LBT process).

As an aside, the existing prior art 5G NR/NG-RAN RACH procedure previously referenced (i.e., the procedure which the UE implements when turned on) includes the following four steps:

1. Based on synchronization information from the gNB, the UE selects a RACH preamble sequence (MSG1) and sends it at the nearest RACH occasion (occurs every 10, 20, 40, 80, or 160 ms). Due to reciprocity, the UE may use the Tx beam corresponding to the best Rx beam determined during synchronization.
2. The gNB responds to the detected preambles with a random access response (RAR) UL grant (MSG2) in PDSCH by using one selected beam. After that, the UE and the gNB establish coarse beam alignment that could be utilized at the subsequent steps.
3. Upon receiving MSG2, the UE responds over the resources scheduled by the gNB, which is thus aware where to detect the MSG3 and which gNB Rx beam should be used.
4. The gNB confirms the above by sending MSG4 in PDSCH using the gNB Tx beam determined at the previous step.

If two or more UEs select the same preamble, it may be decoded at the gNB as one preamble, and gNB then transmits its RAR as for one UE. In this case a preamble collision occurs at the third step above. The UE transmits with its default power or the power advised by the gNB. In case of an unsuccessful transmission, the UE follows a power ramping procedure.

As shown in FIG. 7, the methodology 700 of the present disclosure uses an LBT-based procedure for determining unlicensed spectrum availability, including within heterogeneous bands. These methods may be used, depending on configuration, by either or both of the gNB and UE. For instance, in one variant, the proposed LBT methods can be used if the UE wants to perform simultaneous RACH transmission on multiple bands. Else, UL data transmission is the default use case.

Per step 702, the bandwidth requirements of e.g., a pending request or multiple requests are determined.

Per step 704, the determined bandwidth requirements from step 702 are compared to the bandwidth available to the gNBe (e.g., using a single carrier, or other extant methods such as carrier aggregation within a common (non-heterogeneous) band.

Per step 706, if the bandwidth requirements exceed the available bandwidth, then multi-band (e.g., LBT-based) operation is invoked per step 708.

In one variant (FIG. 7A), step 708 includes first identifying a number of carriers (N) needed to service the required bandwidth per step 714. Next, per step 716, two or more heterogeneous bands ostensibly capable of servicing the request(s) (i.e., with sufficient bandwidth if available) are identified.

Lastly, per step 718, the multi-band LBT procedures are invoked on the identified bands to identify at least the requisite N carriers/bands needed to support the request(s).

In another variant (FIG. 7B), step 708 includes first identifying a number of carriers (N) needed to service the required bandwidth per step 724. Next, per step 726, two or more heterogeneous bands ostensibly capable of servicing the request(s) (i.e., with sufficient bandwidth if available) are identified.

Per step 728, multi-band procedures (which as will be discussed, may or may not include LBT for individual carriers/bands) are invoked on the identified bands to identify at least the requisite N carriers/bands needed to support the request(s). Specifically, at step 730, a carrier/band allocation is requested from a cognizant network entity relative to the designated band (e.g., an AFC system for 6 GHz, or a SAS/Domain Proxy for CBRS). As an aside, automated frequency coordination (AFC) techniques and systems such as those described in "FACT SHEET* Unlicensed Use of the 6 GHz Band Notice of Proposed Rulemaking" ET Docket No. 18-295; GN Docket No. 17-183 dated Oct. 2, 2018 (available at https://docs.fcc.gov/public/attachments/DOC-354364A1.pdf), which is incorporated herein in its entirety, provide frequency allocations that will not interfere (or mitigate interference) with e.g., microwave transmitters. Similarly, SAS entities are used in CBRS systems to allocate quasi-licensed spectrum such as GAA and PAL, so as to avoid interference/pre-emption of incumbent users such as DoD assets.

As such, the present variant of the method leverages these entities to obtain "unencumbered" spectrum allocations directly, without having to (necessarily) invoke LBT and other protocols for channel access. In one implementation, the allocation received from the SAS/AFC (step 732) is used "blindly" without first verifying availability; i.e., the gNBe just assumes that the SAS/AFC is correct. Alternatively, a confirmatory LBT focused on the allocation (or a wider band including the allocation) is performed to verify lack of encumbrance by another user/device.

Per step 734, the other (unallocated) band identified for possible use is scanned per LBT procedures as described elsewhere herein to determine availability of one or more carriers therein.

Once the scan of step 734 is complete, the gNBe may utilize the "mixed" two or more resources (e.g., allocated spectrum and LBT-obtained spectrum) as needed to service the request(s).

Figure 7A:
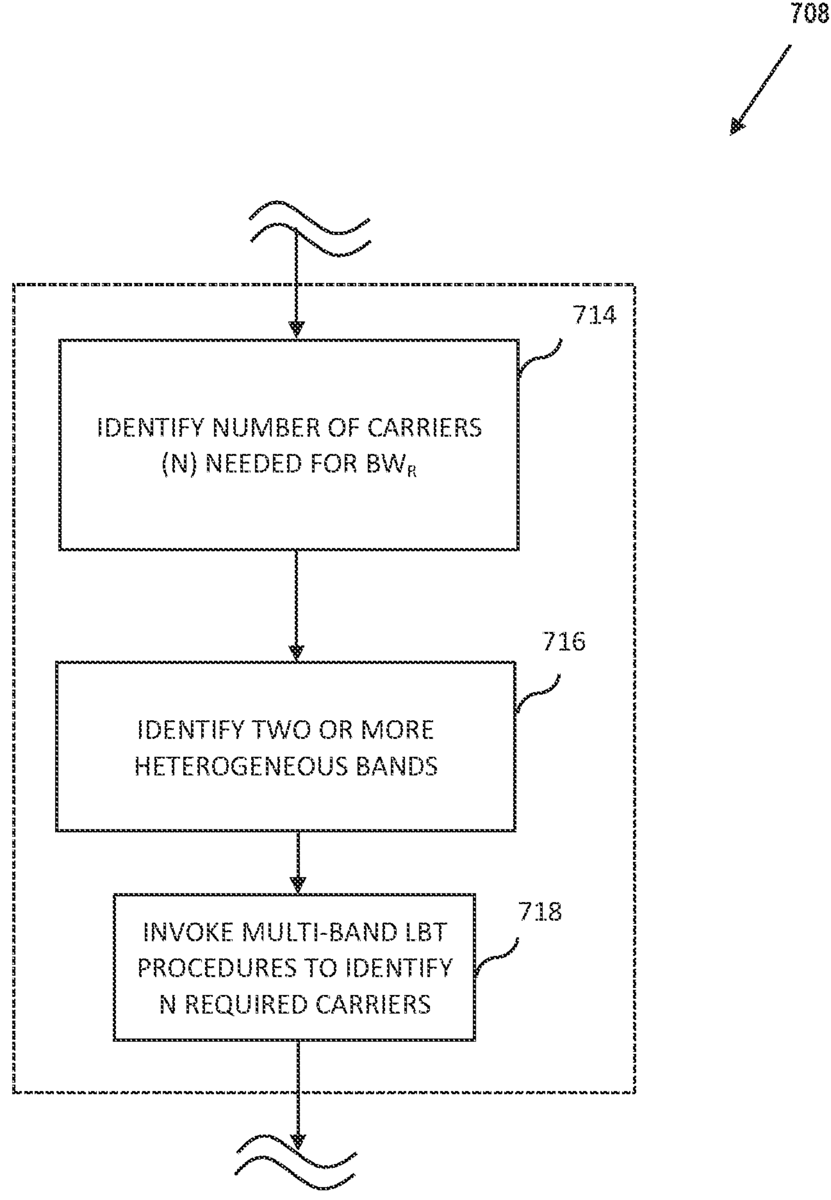
FIG. 7A is logic flow diagram illustrating an exemplary implementation of the LBT procedures of FIG. 7.
Figure 7C:
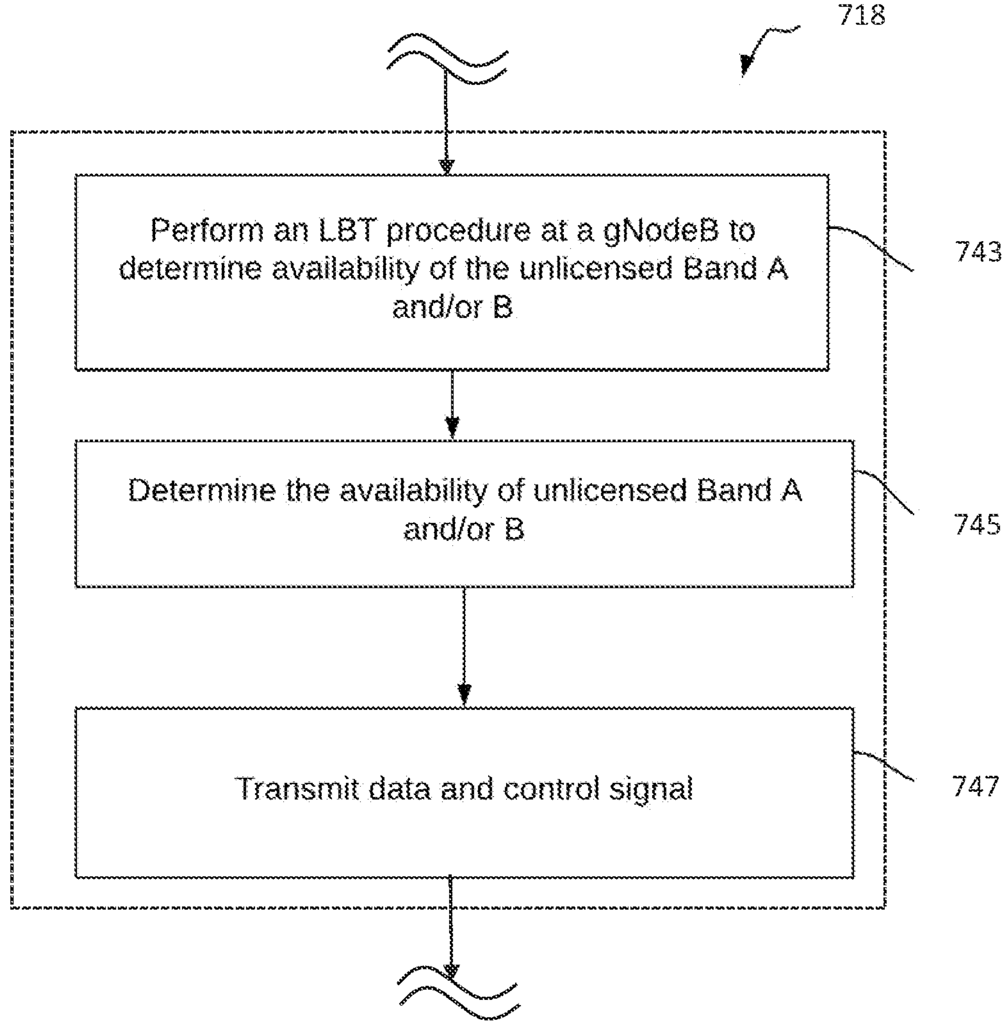
FIG. 7C is logic flow diagram illustrating one exemplary implementation of the multi-band LBT procedures of FIG. 7A.

As far as LBT procedures, as shown in FIG. 7C, one implementation of step 718 of the method 700 of FIG. 7A comprises first performing an LBT procedure at a gNB (e.g., gNBe 201) with respect to a designated frequency band (e.g., Band A and/or Band B) per step 743. For instance, in one variant, an LBT mechanism based on carrier sense, energy detection or correlation (e.g., using a CAZAC sequence such as Zadoff-Chu to affirmatively detect use of the channel by e.g., an LTE-LAA/U device such as via a P-SS synchronization signal), or other mechanism is used. Preamble or other known pattern detection may also be utilized.

Non-limiting examples for (Band A, Band B) ranges useful with the exemplary embodiments of the methods described herein are:

(5-5.9 GHZ, 6.1-7.125 GHz)
(5-5.9 GHZ, 37 GHz)
(5-5.9 GHZ, 3.7 GHZ)
(5-5.9 GHZ, 0.9 GHZ)

It will be appreciated, however, that as discussed in greater detail elsewhere herein, other unlicensed band or even "quasi-licensed bands (e.g., CBRS bands within the 3.55 to 3.70 GHz) may be used consistent with the present disclosure, including for one or all of the multiple bands/carriers assessed as part of the LBT procedures described herein.

Returning again to FIG. 7C, at step 745 a determination is made whether the frequency Band A or B is available or not based on the results of the LBT procedure(s). For instance, if there is significant energy detected on the band (e.g., as compared to a prescribed threshold value), then the band may be assumed to be occupied.

At step 747, when the designated band is available, the gNB may transmit data and control signals on that frequency band (or bands).

Note that the foregoing procedure may be applied within the constraints of extant LBT/backoff mechanisms in place for the band being evaluated. As previously noted, these mechanisms may be heterogeneous across the two (or more) bands being evaluated), and as such, the apparatus described herein may utilize its own particular mechanism for each different band depending on its placement within the RF spectrum (e.g., one mechanism for above 5 GHZ, another for below 5 GHz; or one for 3GPP/5G NR-U, and one for CBRS; or one for LTE-LAA, and one for NR-U; or one for Multefire, and one for NR-U, etc.). These procedures may also be applied iteratively or non-iteratively (i.e., once a given carrier or band fails as being occupied, the utilization logic of the gNBe may cause evaluation of a new band (Band C) in place of Band A, or alternatively Band A may be re-evaluated a number of times or for a prescribed period before it is "abandoned" for another prospective candidate band).

Alternatively, as previously described, multiple carriers/bands can be evaluated in parallel via a common or single wideband scan in parallel, and a more simplistic one-tier approach used; e.g., 25 carriers are scanned simultaneously, and it is presumed at least a minimum number (N) will "pan out" for purposes of utilization based on e.g., historical or anecdotal usage or occupancy statistics. Similarly, if the minimum N is not met, the entire wideband scan can simply be repeated after e.g., a backoff interval until N is satisfied (as opposed to moving to new candidate bands via the more hierarchical approach described above).

It will also be appreciated that in another embodiment, a "COTS" or non-enhanced UE may be used consistent with an enhanced gNB, the latter which performs the LBT-based methodologies described herein effectively on behalf of the UE, and then signals the unmodified UE to share the channel occupancy data with the UE (i.e., data indicating the two or more carriers or bands to be utilized by the UE in communicating data with the gNB), the signalling conducted such as via a broadcast or control channel. In one variant, the UE receives the channel occupancy data and begins channel utilization immediately. In another variant, the UE performs a simple "one-shot" UL CCA (clear channel assessment) on each of the bands prior to UL transmission to verify the availability of the signalled carriers.

Figure 8:
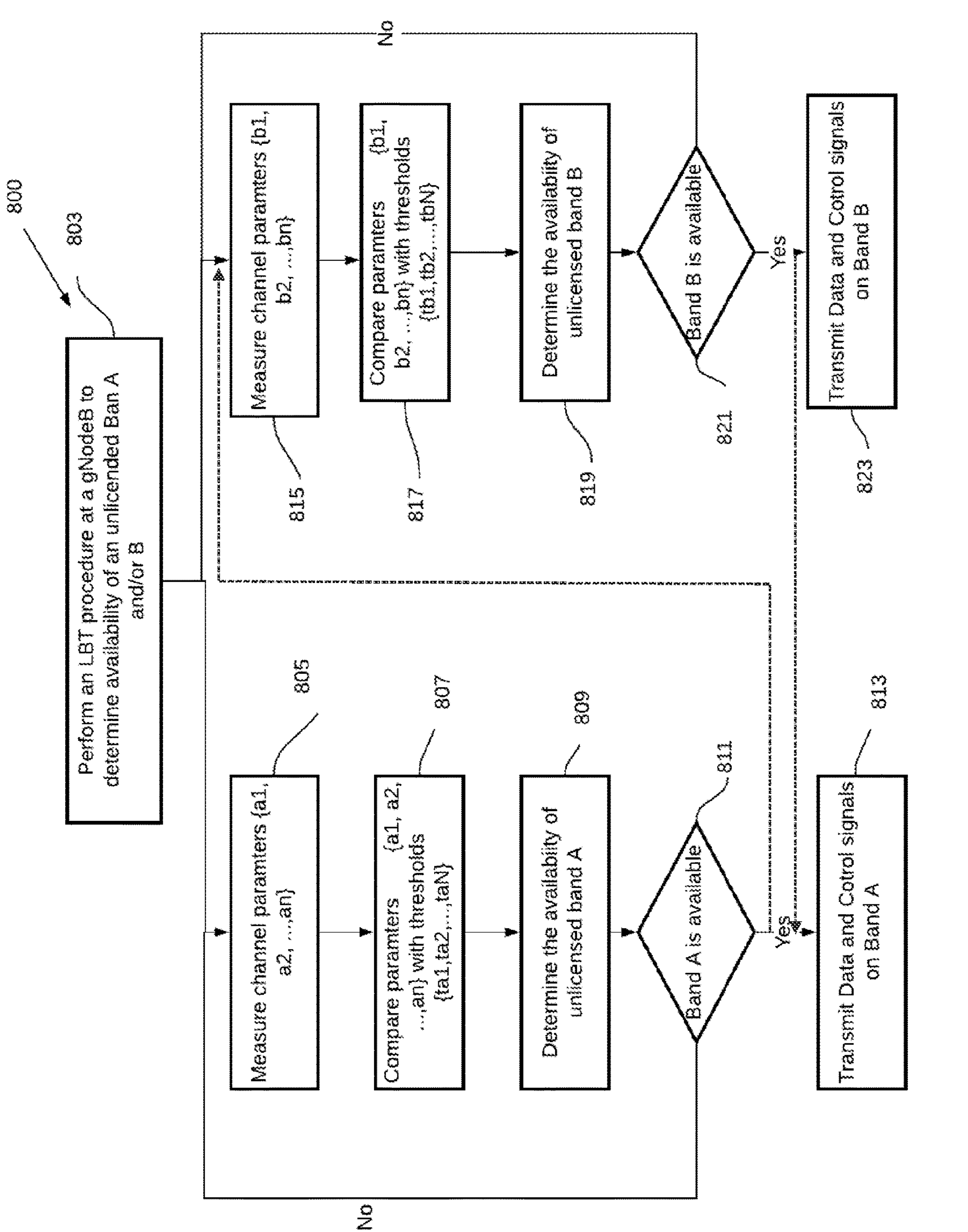
FIG. 8 is logic flow diagram illustrating one implementation of the LBT procedures of FIG. 7C.

Referring to FIG. 8, one particular embodiment of the generalized methodology for unlicensed channel access illustrated in FIG. 7 is shown and described. The method 800 is described with reference to one of the gNBe 201 described in FIG. 2, although it may be applied to other components or processes.

As shown in FIG. 8, the methodology 800 comprises first performing an LBT procedure at a gNB (e.g., the gNBe 201) at frequency Band A and/or Band B at step 803. As described in greater detail below, this step may include unitary, sequential or simultaneous LBT procedures for the different bands of interest, including using heterogeneous LBT mechanisms depending on the particular attributes of the bands being evaluated.

At step 805, the channel parameters {a1, a2, a3, . . . , aN} are measured for Band A.

At step 807, the gNBe compares {a1, a2, a3, . . . , aN} to the thresholds {ta1, ta2, ta3, . . . , taN}.

At step 809, a determination is made whether the frequency band A is available or not.

At step 811, gNB may transmit data and control signal at step 813 or returns to step 805 to measure the channel parameters for the next frame.

At steps 815, the channel parameters {b1, b2, b3, . . . ,bN} for Band B are measured. The gNB compares {ta1, ta2, ta3, . . . , taN} to the thresholds {tb1, tb2, bt3, . . . , btN} at step 817.

At step 819, a determination is made whether the frequency Band B is available or not.

At step 821, gNB may transmit data and control signal at step 823 or returns to step 815 to measure the channel parameters for the next frame.

Note that the logic of steps 805-813 and 815-823 may be performed in parallel versus series as described above. Moreover, as previously referenced, the transmission on Band A (step 813) may be suspended until the results of the Band B evaluation are completed at step 821.

Figure 9:
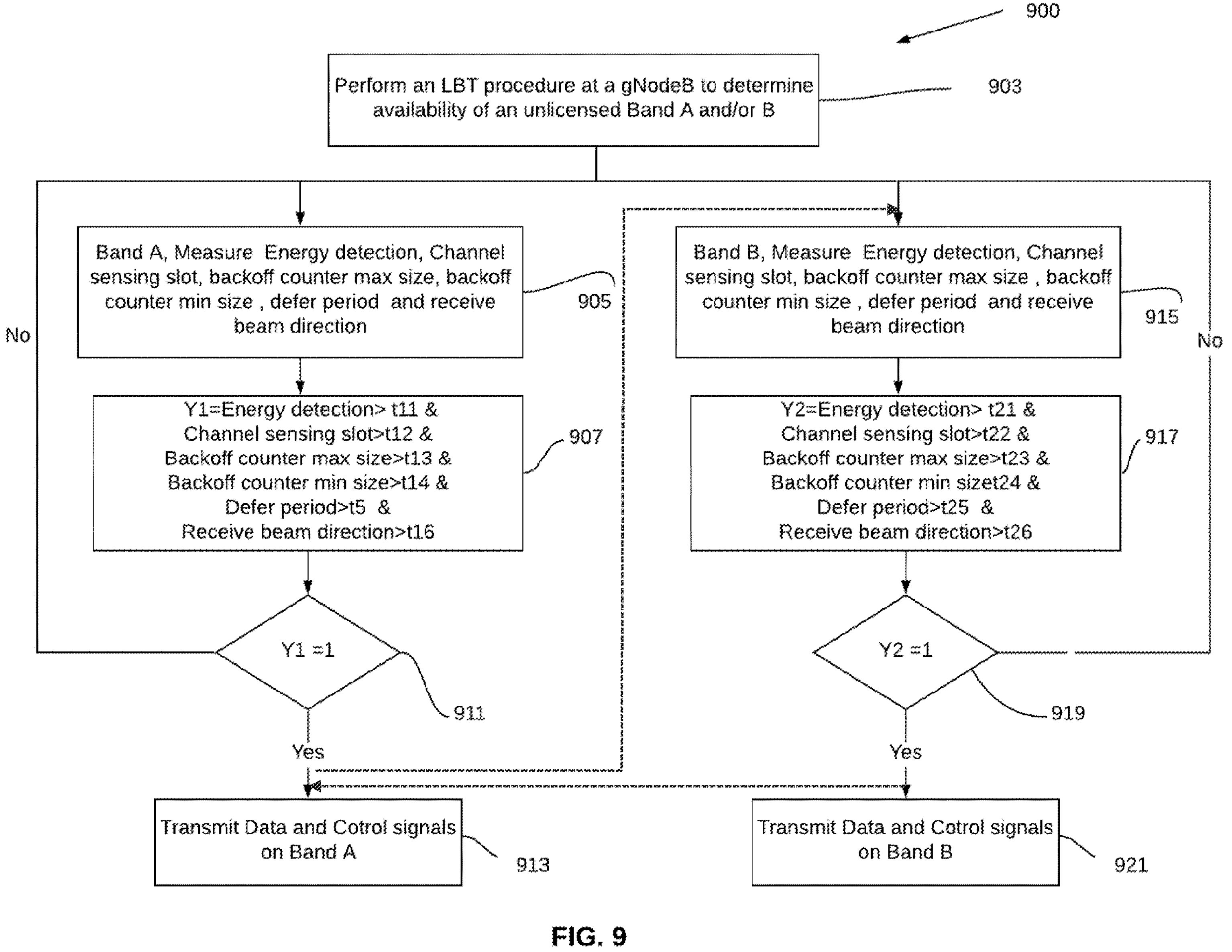
FIG. 9 is logic flow diagram illustrating another implementation of the LBT procedures of FIG. 7C.

FIG. 9 is another exemplary implementation of the generalized methodology illustrated in FIG. 7. As shown in FIG. 9, the methodology 900 comprises first performing an LBT procedure at the gNB e 201 with respect to frequency Band A and/or Band B.

At step 905, one or more of the channel parameters including energy detection, channel sensing slot, backoff counter max size, backoff counter min size, defer period, and receive beam direction are measured for Band A. The gNBe compares these parameters to respective threshold values t11, t12, t13, t14, and t16 at step 907.

At step 911, a determination is made whether frequency Band A is available or not.

At step 911, the gNBe may transmit data and control signals at step 913, or return to step 905 and measure the channel parameters for the next frame.

At steps 915 one or more of the channel parameters including the aforementioned energy detection, channel sensing slot, backoff counter max size, backoff counter min size, defer period, and receive beam direction are measured for Band B. As noted above, depending on Band B access mechanisms in place, this parameter set (and the relative threshold/comparison values below) may be the same of different from that used for Band A.

The gNBe compares these measured parameters to the respective thresholds t21, t22, t23, t24, t25 and t26 at step 917.

At step 919, a determination is made whether frequency Band B is available or not.

At step 919, the gNBe may transmit data and control signals at step 921 or return to step 915 to measure the channel parameters for the next frame.

As with FIG. 8, the logic of steps 905-913 and 915-921 may be performed in parallel versus series as described above. Moreover, as previously referenced, the transmission on Band A (step 913) may be suspended until the results of the Band B evaluation are completed at step 919.

Figure 10:
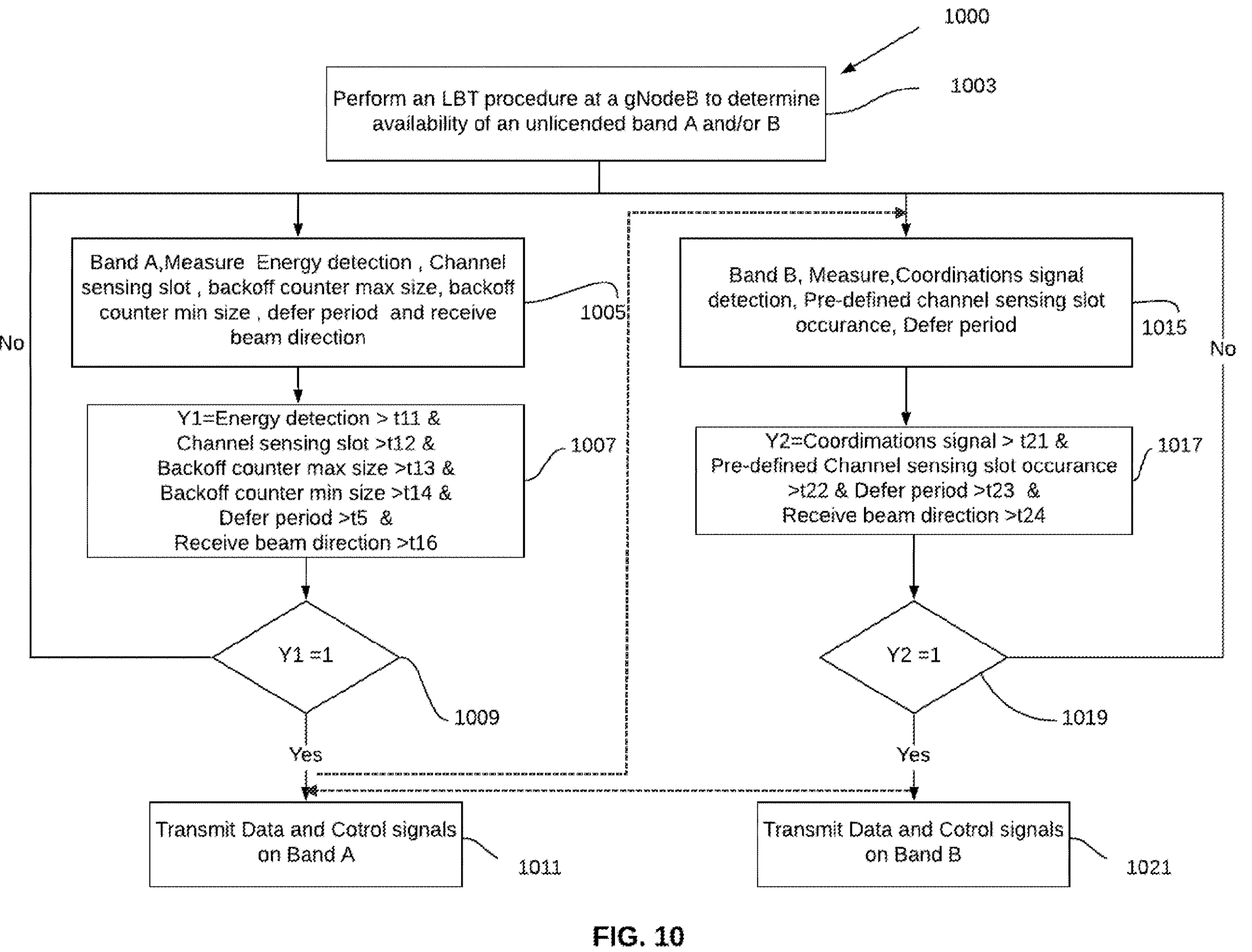
FIG. 10 is logic flow diagram illustrating yet another implementation of the LBT procedures of FIG. 7C.

FIG. 10 is another exemplary implementation of the generalized methodology illustrated in FIG. 7. As shown in FIG. 10, the methodology 1000 comprises first performing an LBT procedure at the gNBe for frequency Band A and/or band B.

At step 1005, one or more of the channel parameters including energy detection, channel sensing slot, backoff counter max size, backoff counter min size, defer period, and receive beam direction are measured for Band A. The gNBe compares these parameters to threshold t11, t12, t13, t14, and t16 at step 1007.

At step 1009, a determination is made whether the frequency Band A is available or not.

At step 1011, the gNB may transmit data and control signals at step 1011, or returns to step 1005 and measures the channel parameters for the next frame.

At steps 1015, one or more of a coordination signal, channel sensing slot occurrence, defer period, and receive beam direction are measured. In one embodiment, the coordination signal is broadcast by a node (e.g., a centralized network node) that dynamically allocates device-specific channel sensing and/or channel access data. The coordination signal may be used for example with respect to Band B LBT as a surrogate or substitute for the non-synchronized approach used for Band A in this embodiment; rather than performing energy detection, etc., Band B will in effect be predefined by the network infrastructure. For instance, in one variant, the coordination signal may comprise a common preamble that has a specific signature or pattern that the unlicensed devices attempt to detect, as opposed to "vanilla" energy detection, similar to the preamble used within the IEEE Std. 802.11 protocols.

The gNBe next compares these measured parameters to the thresholds t21, t22, t23, t24 at step 1017. At step 1019, a determination is made whether the frequency Band B is available or not.

At step 1019, gNB may transmit data and control signals at step 1021, or return to step 1015 to measure the channel parameters for the next frame.

As with FIGS. 8 and 9, the logic of steps 1005-1011 and 1015-1021 may be performed in parallel versus series as described above. Moreover, as previously referenced, the transmission on Band A (step 1011) may be suspended until the results of the "coordinated" Band B evaluation are completed at step 1019. Moreover, the coordination signal may be used to further enable aggregation of Band A and B, such as for synchronization purposes. Additionally, the coordination signals may be used by two entities (e.g., a gNBe and UEe) to coordinate UL/DL transmission scheduling.

It will be appreciated that while logic of the method 1000 of FIG. 10 uses a first type of heterogeneity between Band A and B detection (e.g., a first type of LBT protocol for Band A, followed by a "coordinated" LBT protocol for Band B), other types of heterogeneous arrangements are contemplated by the present disclosure. For example, in one variant (not shown), the Band A/B protocols may be different in their scope of frequency range sensing/detection (e.g., one may be wide-band compared to a narrower sense on the other). In another variant, the set and/or sequence of detection measurements may be different between the two (or more) bands. For instance, as a non-limiting example, the following heterogeneous "arrays" of detection parameters are used on Band A and Band B, respectively:

1. LBT A: {Energy detection threshold 1 (dBm), channel sensing slot duration 1 (μs), backoff counter max size 1 (in slots), backoff counter min size 1 (in slots), defer period 1 (μs), receive beam directions 1}

2. LBT B: {Initial signal or preamble detection threshold (dBm), energy detection threshold 2 (dBm), channel sensing slot duration 2 (μs), backoff counter max size 2 (in slots), backoff counter min size 2 (in slots), defer period 2 (μs), receive beam directions 2}.

In yet another variant, the iteration or type of backoff parameters may be different in the two (or more) bands; e.g., consistent with extant mechanism in each of the different unlicensed bands. For instance, one Band may utilize a random number-based backoff mechanism, while another might have no backoff mechanism but rather rely on collision detection (CD) and retry only.

FIG. 11 is a flowchart illustrating an example of a generalized methodology 1100 for unlicensed channel access as applied to a UE (e.g., the exemplary enhanced UEe 203 described subsequently herein with respect to FIG. 17), although the methodology may be applied to other entities or processes as will be recognized by those of ordinary skill given the present disclosure.

As shown, the method 1100 of FIG. 11 includes first initializing the UEe 203 (e.g., on power-up), such as in the case where the UE is completely powered down and not connected to any wireless network (step 1102). Per step 1104, the UEe utilizes its 5G NR-U stack or LTE stack and existing settings to "RACH" to the network (i.e., a gNBe 201 within proximity thereto). This use of extant protocols enables the UE to establish communication channels (including control channels) with the network by which it can receive data directing it to further utilize the LBT-based heterogeneous unlicensed band procedures described herein. Note that the initial RACK may also be to a licensed network (e.g., the user's cellular service provider).

Next, per step 1106, the UEe receives unlicensed LBT procedure parameters from the gNBe (e.g., via dedicated or broadcast RRC configuration), directing it to switch to unlicensed heterogeneous band service. For instance, the gNBe may have a pending service request to deliver data to the UEe, which has been dormant for a period of time, and it intends/prefers to do so via the NR-U multi-band spectrum.

Finally, per step 1108, the UEe invokes the multi-band procedures to initiate LBT-based operation per the gNBe directive. Specifically, in one variant, the UEe begins the multi-band LBT scans (e.g., as directed by the band allocations provided by the gNBe on the PDCCH) to determine availability of two or more carriers by which it can establish UL/DL channels 205, 207 as shown in FIG. 2 previously described herein.

Figure 11A:
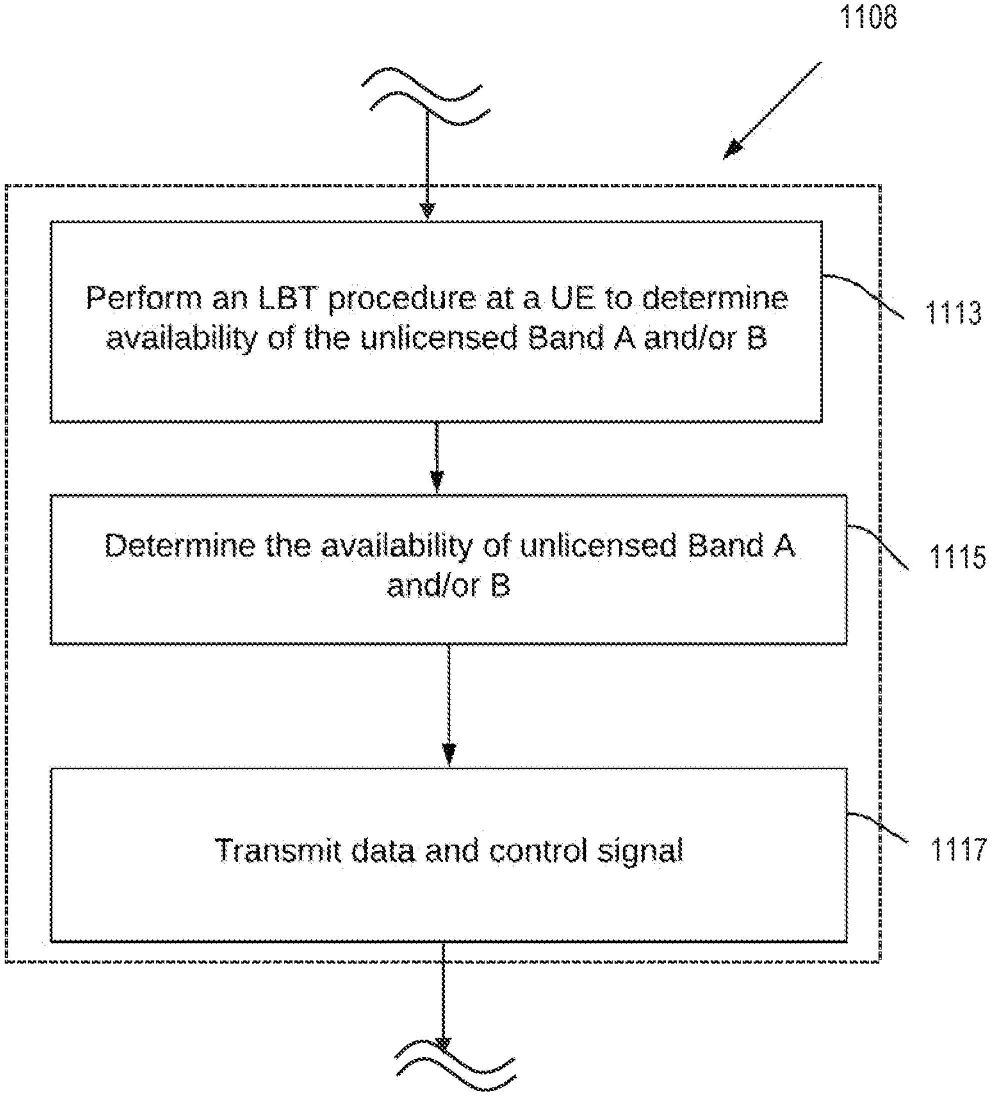
FIG. 11A is logic flow diagram illustrating an exemplary implementation of the LBT procedures of the method of FIG. 11.

As shown in FIG. 11A the methodology of step 1108 of FIG. 11 in one variant comprises first performing an LBT procedure at the UE (e.g. UEe 203) with respect to frequency Band A and/or Band B per step 1113.

At step 1115 a determination is made whether frequency Band A or B is available or not.

At step 1117, the UEe may transmit data and control signals on frequency Band A and/or B.

Figure 12:
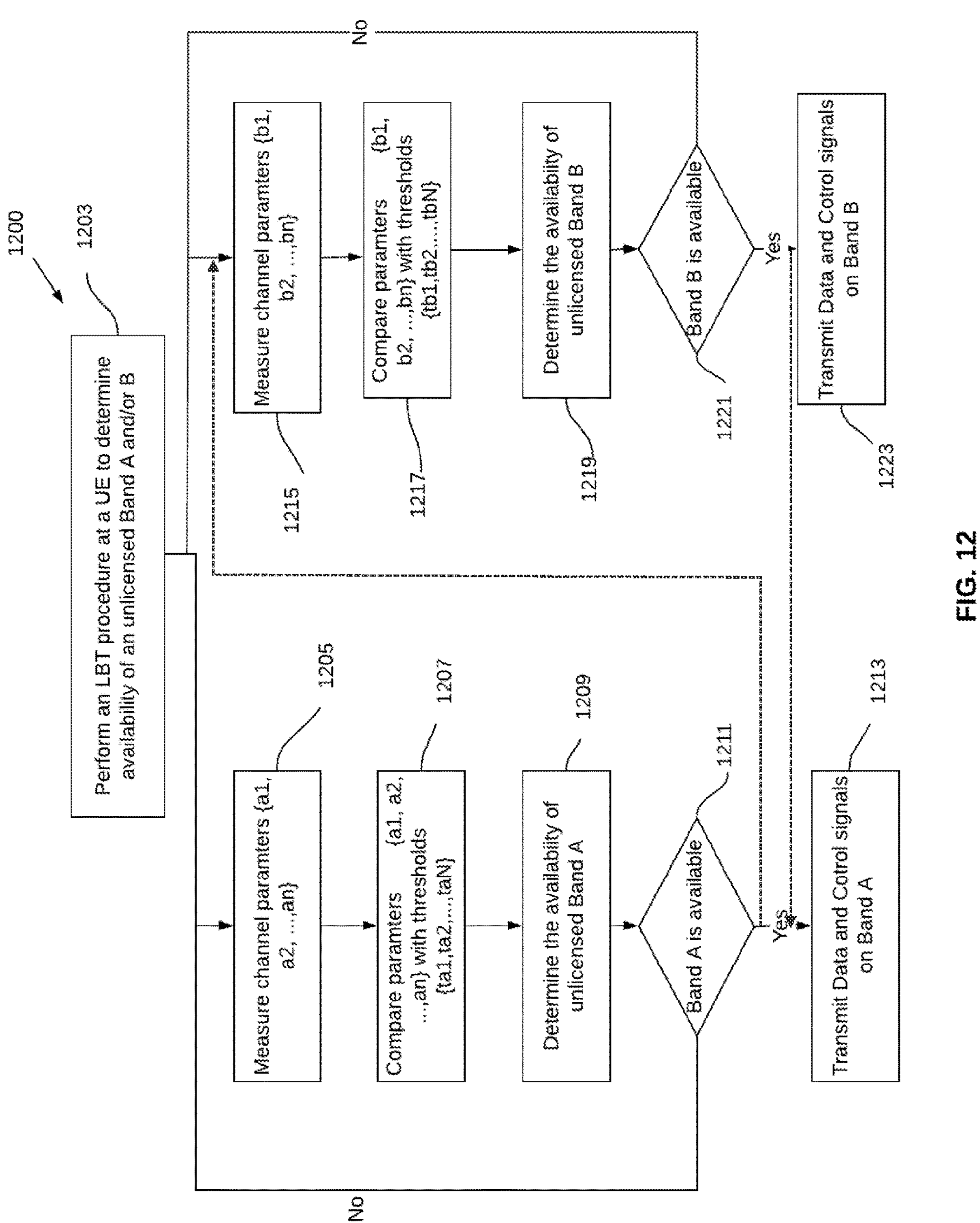
FIG. 12 is logic flow diagram illustrating one implementation of the LBT procedures of FIG. 11A.

FIG. 12 is a flowchart illustrating another example of a method 1200 for unlicensed channel access. The method 1200 is described with reference to one of the UEs 203, 602, and/or 653 described in FIGS. 2, 6A and/or 6B.

As shown in FIG. 12 the methodology 1200 comprises first performing an LBT procedure at the UE (e.g., UE 203) for the frequency Band A and/or B.

At step 1205 one or more of the channel parameters {a1, a2, a3, . . . , aN} are measured. The UE compares the {a1, a2, a3, . . . , aN} to the respective thresholds {ta1, ta2, ta3, . . . , taN} at step 1207.

At step 1209, a determination is made whether the frequency Band A is available or not.

At step 1211, the UEe may transmit data and control signals at step 1213, or return to step 1205 to measure the channel parameters for the next frame.

At steps 1215, the channel parameters {b1, b2, b3, . . . ,bN} are measured for Band B. At step 1217, the UE compares the {ta1, ta2, ta3 . . . taN} to the respective thresholds {tb1, tb2, bt3, . . . , btN}.

At step 1219, a determination is made whether the frequency Band A is available or not.

At step 1221, the UEe may transmit data and control signals at step 1223, or return to step 1215 to measure the channel parameters for the next frame.

Figure 13:
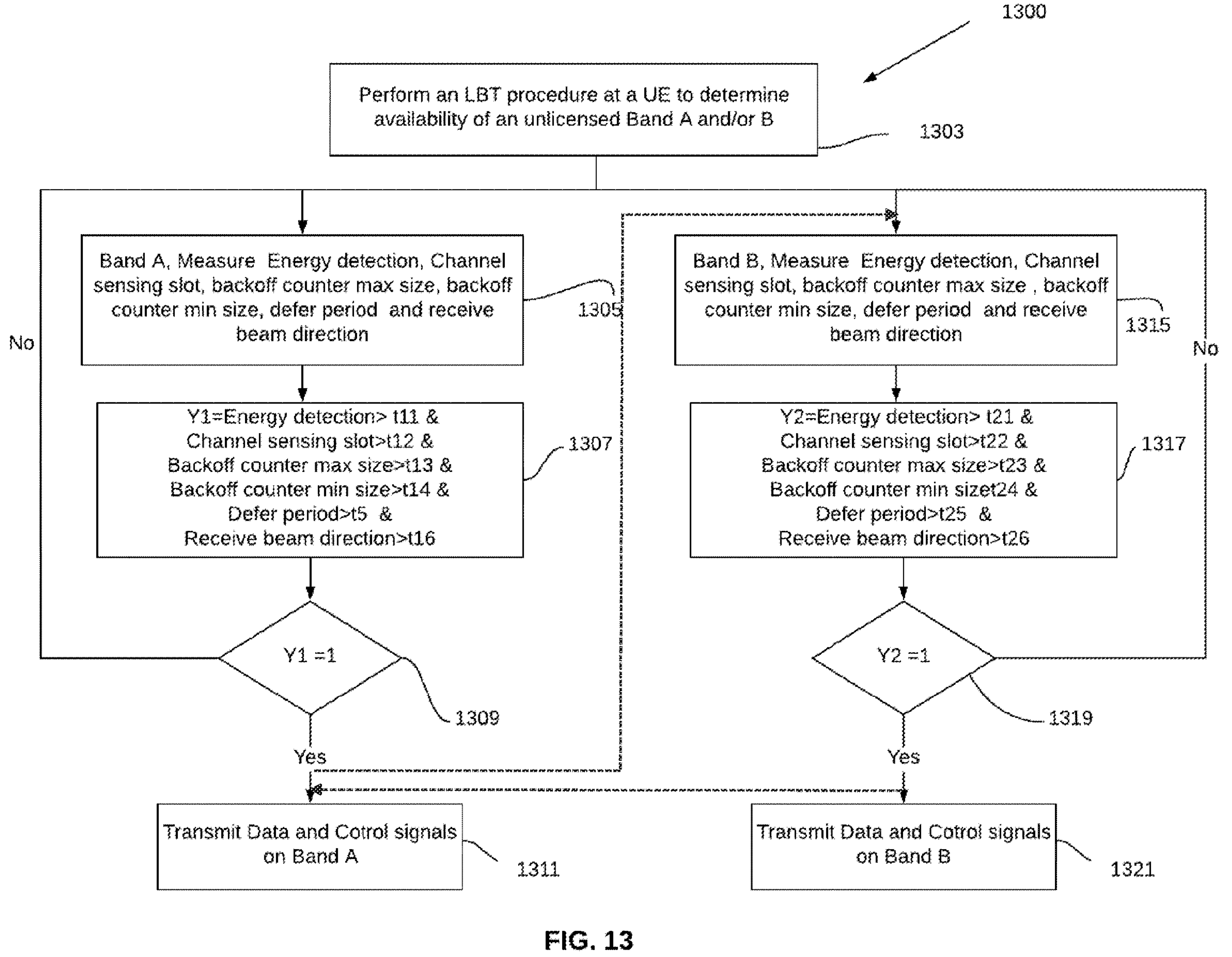
FIG. 13 is logic flow diagram illustrating another implementation of the LBT procedures of FIG. 11A.

Referring to FIG. 13, one particular implementation of the generalized methodology illustrated in FIG. 12 is shown.

As shown in FIG. 13 the methodology 1300 comprises first performing an LBT procedure at the UEe (e.g., UEe 203) for the frequency Band A and/or Band B.

At step 1305 one or more of the channel parameters including energy detection, channel sensing slot, backoff counter max size, backoff counter min size, defer period, and receive beam direction are measured for Band A. The UE compares these parameters to respective thresholds t11, t12, t13, t14, and t16 at step 1307.

At step 1309, a determination is made whether the frequency Band A is available or not.

At step 1311, the UE may transmit data and control signals at step 1311, or return to step 1405 to measure the channel parameters for the next frame.

At steps 1315, one or more of the channel parameters including energy detection, channel sensing slot, backoff counter max size, backoff counter min size, defer period, and receive beam direction are measured are measured for Band B. The UE compares these measured parameters to the respective thresholds t21, t22, t23, t24, t25 and t26 at step 1317.

At step 1319, a determination is made whether the frequency Band B is available or not.

At step 1319, UE determines to transmit data and control signals at step 1321, or return to step 1315 to measure the channel parameters for the next frame.

Figure 14:
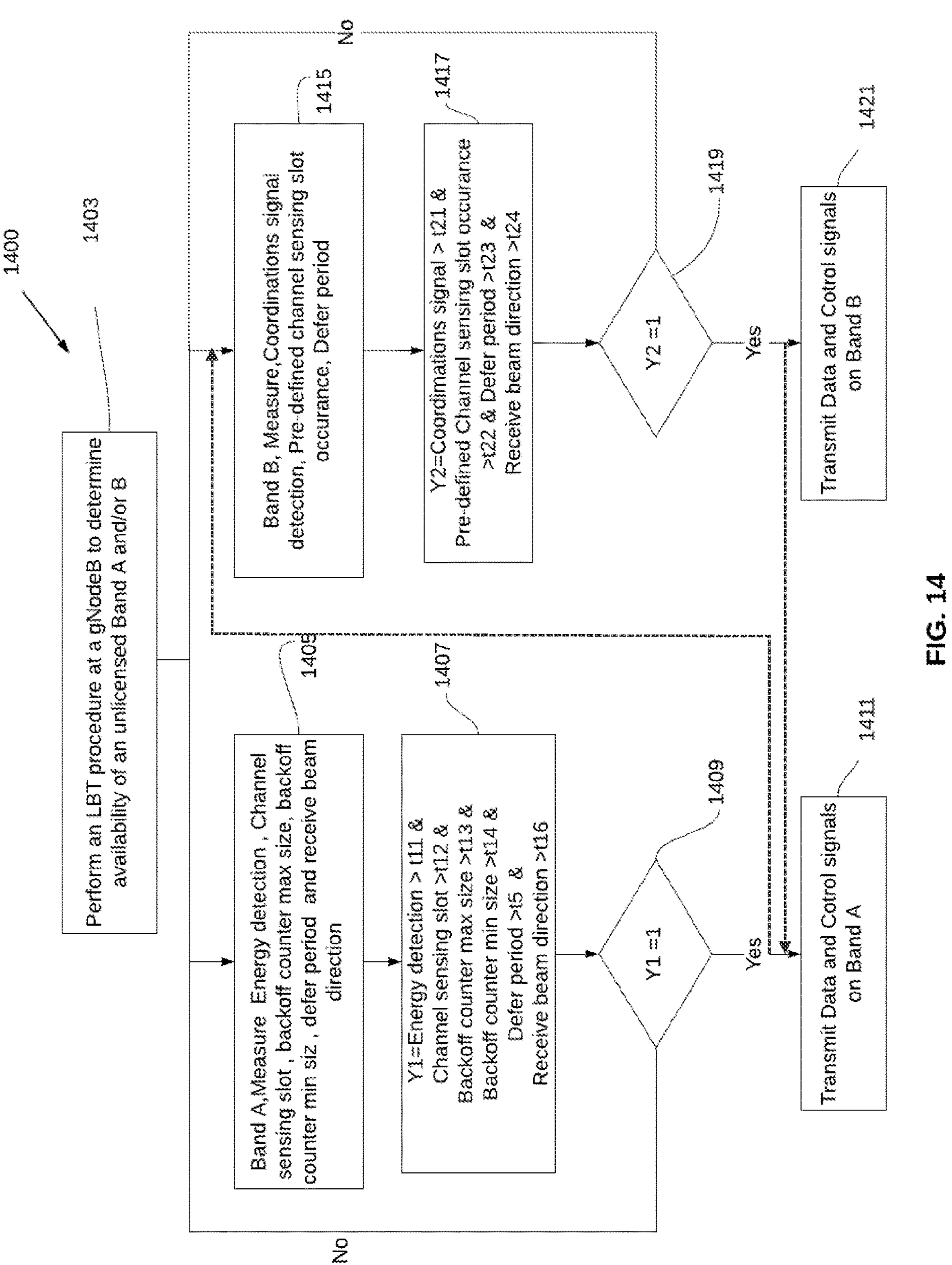
FIG. 14 is logic flow diagram illustrating yet another LBT procedures of FIG. 11A.

FIG. 14 is another implementation of the generalized methodology illustrated in FIG. 7. As shown in FIG. 14, the methodology 1400 comprises first performing an LBT procedure at the UEe for frequency Band A and/or Band B. At step 145, one or more the channel parameters including energy detection, channel sensing slot, backoff counter max size, backoff counter min size, defer period, and receive beam direction are measured for Band A. The UEe compares these parameters to respective threshold t11, t12, t13, t14, and t16 at step 1407.

At step 1409, a determination is made whether the frequency Band A is available or not.

At step 1411, gNB may transmit data and control signals at step 1411, or return to step 1405 and measure the channel parameters for the next frame.

At step 1415, one or more of a coordination signal, channel sensing slot occurrence, defer period, and receive beam direction are measured by the UEe. In one embodiment, the coordination signal is broadcast by a node (e.g., a centralized network node) that dynamically allocates device-specific channel sensing and/or channel access data. The coordination signal may be used for example with respect to Band B LBT as a surrogate or substitute for the non-synchronized approach used for Band A in this embodiment; rather than performing energy detection, etc., Band B will in effect be predefined by the network infrastructure.

The UEe compares these measured parameters to the respective thresholds t21, t22, t23, t24 at step 1417.

At step 1419, a determination is made whether the frequency Band B is available or not.

At step 1419, the UEe may transmit data and control signal at step 1421 or returns to step 1415 to measure the channel parameters for the next frame.

It will be appreciated that the channel access parameters referenced in the various embodiments of FIGS. 12-14 discussed above can, in one variant, be assumed by the UE (e.g., set to pre-defined default values for initial access). Once the RRC (Radio Resource Control) connection is completed, then the UE can use whatever carriers that the network is indicating for it to use; i.e., the foregoing parameters can be configured by higher-layer signalling.

Figures 14A, 14B:
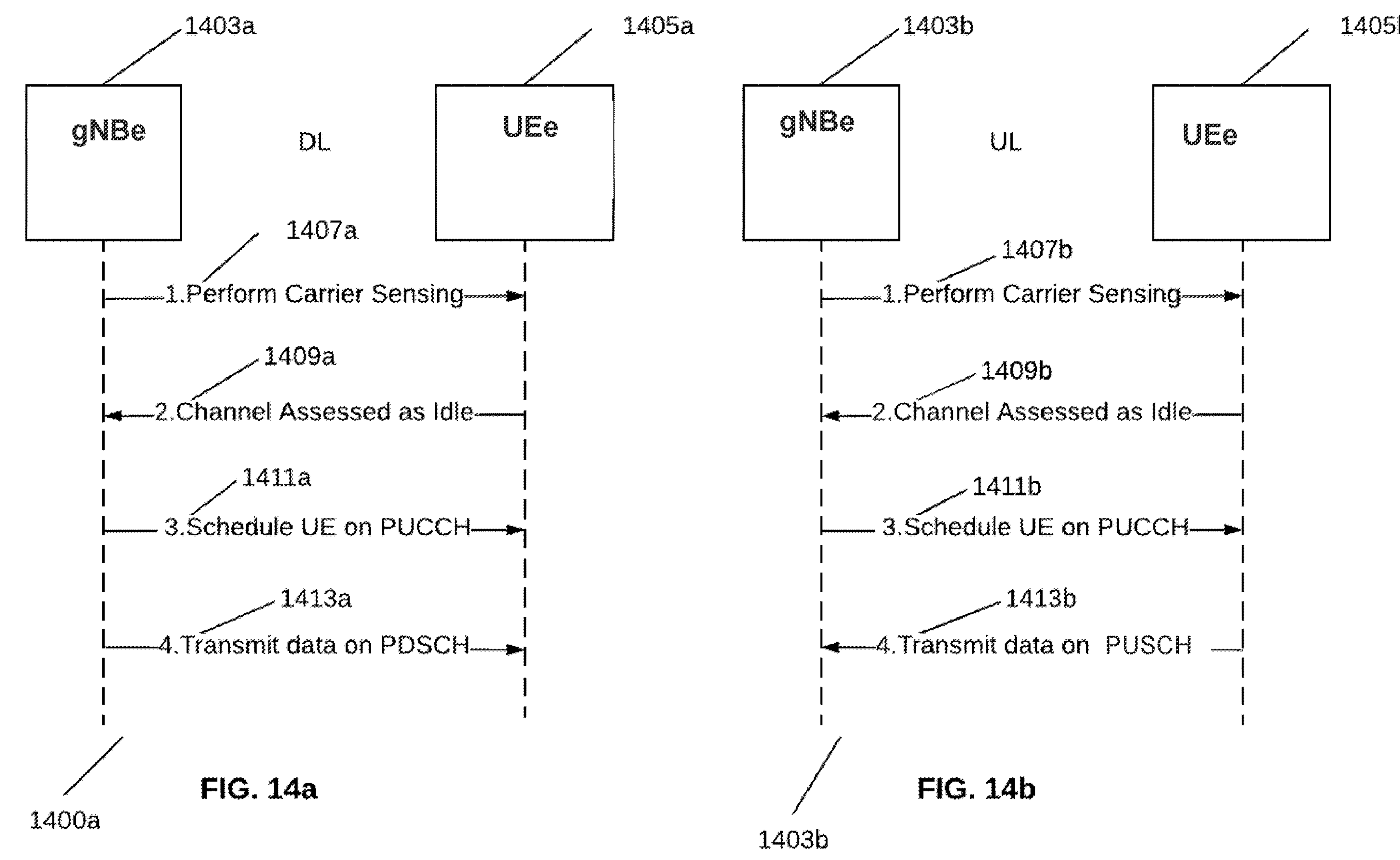
FIGS. 14A-14B are ladder diagrams illustrating the channel access procedure as requested by a gNB according to the present disclosure.
Figure 14C:
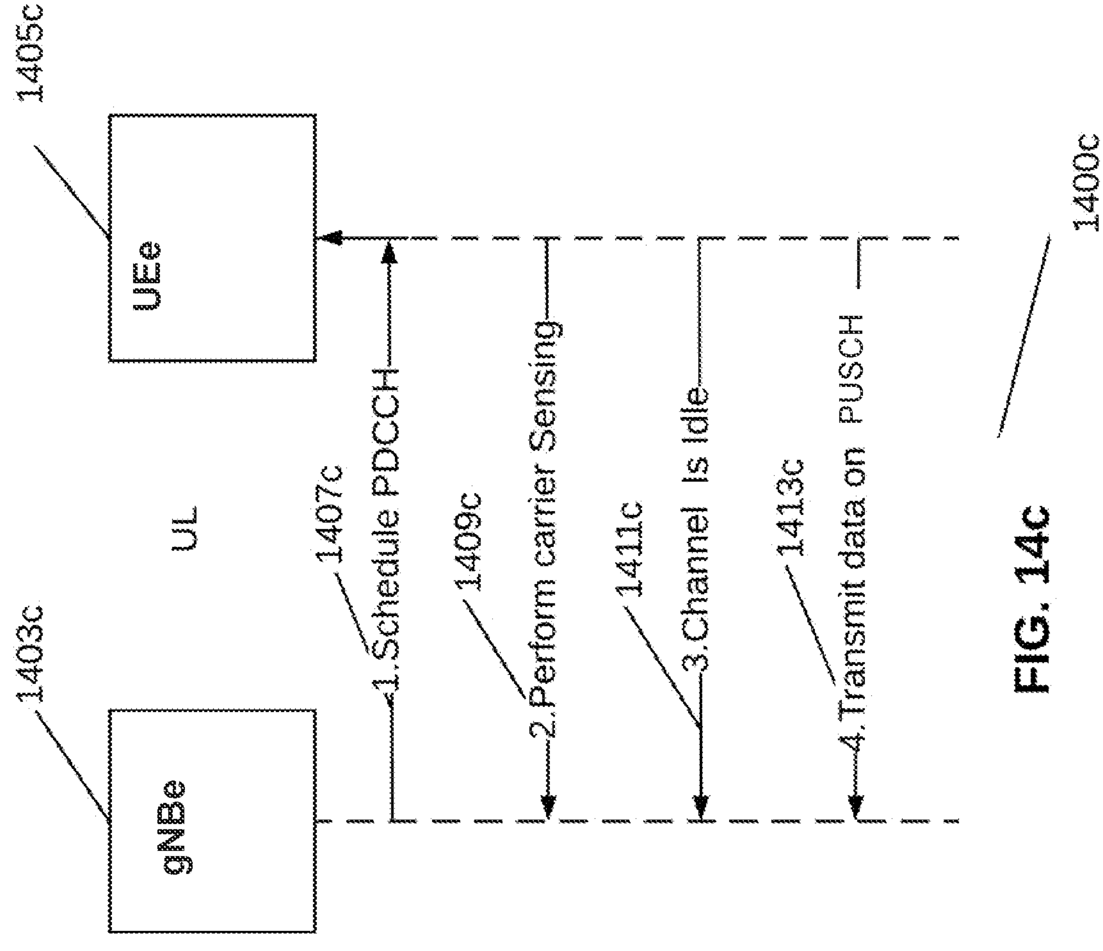
FIG. 14C is a ladder diagrams illustrating the channel access procedure as requested by a UE according to the present disclosure.

FIG. 14A-14C are ladder diagrams illustrating examples of LBT signalling procedures for DL/UL (in this case adapted for the present disclosure based on extant LBT protocols; see RAN WG1 Meeting #79, San Francisco, USA, 17-21 Apr. 2014, incorporated herein by reference in its entirety).

FIGS. 14A and 14B are described herein with respect to one of the gNBe devices 201. The DL unlicensed channel access is described in FIG. 14A. At step **1407*a* of the methodology 1400*a*, the gNBe performs carrier sensing with reference to steps 805, 815 905, 915, 1005, and/or 1015 of methods of FIGS. 8, 9, and/or 10, respectively. If the channel is assessed idle at step 1409*a*, with reference to steps 811, 821, 911, 919, 1009 and/or 1019 of methods of FIGS. 8, 9, and/or 10, the gNB schedules UE at step 1411*a* on PDCCH channel. Per step 1413*a*, the gNB may start transmitting data and control signals on PDSH channel. As can be appreciated, FIG. 14A** represents only the portion of the process for a given Band or carrier; similar logic applies to Band B, and other bands if used.

UL unlicensed channel access is described in FIG. 14B. At step **1407*b* of the methodology 1400*b*, the gNBe performs carrier sensing with reference to steps 805, 815 905, 915, 1005, and/or 1015 of methods of FIGS. 8, 9, and/or 10. If the channel is assessed idle at step 1409*b*, with reference to steps 811, 821, 911, 919, 1009 and/or 1019 of methods of FIGS. 8, 9, and/or 10, the gNBe schedules the UE (or UEe) at step 1411*a* on PDCCH channel. Per step 1413*b***, the UE/UEe may start transmitting data and control signal on PUSCH channel.

FIG. 14C is described with respect to the UEe device 203, for an UL unlicensed channel access. At step **1407*c* of the methodology 1400*c*, the gNB schedules the UEe on the PDCCH. At step 1409*c*, the UEe performs carrier sensing. If the channel is assessed as idle at step 1411*c***, the UE may start transmitting data and control signal on PUSCH channel.

Service Provider Network

FIG. 15 illustrates a typical service provider network configuration useful with the features of the enhanced cell activation apparatus and methods described herein. This service provider network 1500 is used in one embodiment of the disclosure to provide backbone and backhaul from the service provider's service nodes, such as HFC cable or FTTC/FTTH drops to different premises or venues/residences. For example, one or more stand-alone or embedded DOCSIS cable modems (CMs) 1512 are in data communication with the various NR architecture components; e.g., enhanced gNBs 201 which include one or more enhanced CU (CUe) devices and/or one or more enhanced DU (Due) devices, which include the multi-carrier NR-U capability described above with respect to FIGS. 2-14C as described in greater detail below with respect to FIGS. 15A-15D), so as to provide two-way data communication to the served components. Also shown are one or more enhanced UE (UEe) of the type discussed below with respect to FIG. 17, which may include the multi-carrier NR-U functionality described herein in certain embodiments.

In certain embodiments, the service provider network 1500 also advantageously permits the aggregation and/or analysis of subscriber- or account-specific data (including inter alia, particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 1507 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

As a brief aside, a number of different identifiers are used in the NG-RAN architecture, including those of UEs and for other network entities. Specifically:

- the AMF Identifier (AMF ID) is used to identify an AMF (Access and Mobility Management Function);
- the NR Cell Global Identifier (NCGI), is used to identify NR cells globally, and is constructed from the PLMN identity to which the cell belongs, and the NR Cell Identity (NCI) of the cell;
- the gNB Identifier (gNB ID) is used to identify gNBs within a PLMN, and is contained within the NCI of its cells;
- the Global gNB ID, which is used to identify gNBs globally, and is constructed from the PLMN identity to which the gNB belongs, and the gNB ID;
- the Tracking Area identity (TAI), which is used to identify tracking areas, and is constructed from the PLMN identity to which the tracking area belongs, and the TAC (Tracking Area Code) of the Tracking Area; and
- the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

The MSO network architecture 1500 of FIG. 15 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 15 may deliver Internet data and OTT (over-the-top) services to the end users (including those of the DU/DUe 1506) via the Internet protocol (IP) and TCP (i.e., over the 5G radio bearer), although other protocols and transport mechanisms of the type well known in the digital communication art may be substituted.

The network architecture 1500 of FIG. 15 generally includes one or more headends 1507 in communication with at least one hub 1517 via an optical ring 1537. The distribution hub 1517 is able to provide content to various "client" devices, and gateway devices 1560 as applicable, via an interposed network infrastructure 1545. It will be appreciated from examination of FIG. 15 that the various gNB components (including DU/DUes and CUes) may each act as a "client" device of the network. For example, in many installations, the CUe 1504 of a given gNB is physically disparate or removed from the locations of its constituent DUs 1506, and hence an interposed (e.g., wired, wireless, optical) PHY bearer is needed to communicate data between the DUes and CUe of a given gNB. In one such architecture, the CUe may be placed further toward the core of the MSO distribution network, while the various constituent DUes are placed at the edge. Alternatively, both devices may be near the edge (and e.g., served by edge QAMs or RF carriers 1540 as backhaul as shown in FIG. 15). In both cases, the MSO infrastructure may be used to backhaul data from each device and communicate it to, via the MSO infrastructure, the other components, much as two geographically disparate customers of a given MSO might communicate data via their respective DOCSIS modems in their premises. Each component has an IP address within the network, and as such can be accessed by the other components.

Alternatively, the CU/CUe devices 1504 (which in effect aggregate the traffic from the various constituent DUs towards the NG Core 209), may have a dedicated high bandwidth "drop."

Moreover, a given CU/CUe and DU/DUe may be co-located as desired, as shown by the combined unit 201 in FIG. 15. This may also be "hybridized," such as where one constituent DU/DUe is co-located (and potentially physically integrated) with the CU/CUe, while the remaining DU/DUe of that CU/CUe are geographically and physically distributed.

In the MSO network 1500 of FIG. 15, various content sources 1503, 1503*a* are used to provide content to content servers 1504, 1505 and origin servers 1521. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 1503*a* (such as e.g., a web server) provide Internet content to a packetized content origin server(s) 1521. Other IP content may also be received at the origin server(s) 1521, such as voice over IP (VOIP) and/or IPTV content. Content may also be received from subscriber and non-subscriber devices (e.g., a PC or smartphone-originated user made video).

The network architecture 1500 of FIG. 15 may further include a legacy multiplexer/encrypter/modulator (MEM; not shown). In the present context, the content server 1504 and packetized content server 1521 may be coupled via a LAN to a headend switching device 1522 such as an 802.3z Gigabit Ethernet (or "10G") device. For downstream delivery via the MSO infrastructure (i.e., QAMs), video and audio content is multiplexed at the headend 1507 and transmitted to the edge switch device 1538 (which may also comprise an 802.3z Gigabit Ethernet device) via the optical ring 1537.

In one exemplary content delivery paradigm, MPEG-based video content (e.g., MPEG-2, H.264/AVC or H.265/HEVC) may be delivered to user IP-based client devices over the relevant physical transport (e.g., DOCSIS channels and 5G NR bearers of the respective DU/DUe 1506); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast.

Individual devices such as cable modems 1512 and associated gNB devices 201 of the implementation of FIG. 15 may be configured to monitor the particular assigned RF channel (such as via a port or socket ID/address, or other such mechanism) for IP packets intended for the gNB/subscriber premises/address that they serve. The IP packets associated with Internet services are received by edge switch, and forwarded to the cable modem termination system (CMTS) 1539. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the "client" gNB devices. The IP packets are typically transmitted on RF channels that are different than the "in band" RF channels used for the broadcast video and audio programming.

In one implementation, the CMs 1512 shown in FIG. 15 each service a premises or venue, such as a conference center, apartment building, enterprise, or hospitality structure (e.g., hotel), which includes one or more DU/DUe nodes for provision of 5G NR services, and may also service WLAN (e.g., 802.11-2016 compliant Wi-Fi) nodes for WLAN access (e.g., within 2.4 GHz ISM band), or even E-UTRAN femtocells, CBRS (Citizens Broadband Radio Service) nodes, or other such devices.

In parallel with (or in place of) the foregoing delivery mechanisms, the MSO backbone 1531 and other network components can be used to deliver packetized content to the "client" gNB devices via non-MSO networks. For example, so-called "OTT" content (whether tightly coupled or otherwise) can be ingested, stored within the MSO's network infrastructure, and delivered to the gNB CU/CUe 1504 via an interposed service provider network (which may include a public Internet) 1511 (e.g., at a local coffee shop, via a DU/DUe connected to the coffee shop's service provider via a modem, with the user's IP-enabled end-user device utilizing an Internet browser or MSO/third-party app to stream content according to an HTTP-based approach over the MSO backbone 1531 to the third party network to the service provider modem (or optical demodulator) to the DU/DUe, and to the user device via the DU/DUe NR wireless interface.

It will further be recognized that user-plane data/traffic may also be routed and delivered apart from the CU/CUe. In one implementation (described above), the CU/CUe hosts both the RRC (control-plane) and PDCP (user-plane); however, as but one alternate embodiment, a so-called "disaggregated" CU/CUe may be utilized, wherein a CU/CUeCP entity (i.e., CU/CUe-control plane) hosts only the RRC related functions, and a CU/CUe-UP (CU/CUe-user plane) which is configured to host only PDCP/SDAP (user-plane) functions. The CU/CUe-CP and CU/CUe-UP entities can, in one variant, interface data and inter-process communications via an E1 data interface, although other approaches for communication may be used. It will also be appreciated that the CU/CUe-CP and CU/CUe-UP may be controlled and/or operated by different entities, such as where one service provider or network operator maintains cognizance/control over the CU/CUe-UP, and another over the CU/CUe-CP, and the operations of the two coordinated according to one or more prescribed operational or service policies or rules.

In certain embodiments, each DU/DUe is located within and/or services one or more areas within one or more venues or residences (e.g., a building, room, or plaza for commercial, corporate, academic purposes, and/or any other space suitable for wireless access). Each DU/DUe is configured to provide wireless network coverage within its coverage or connectivity range for its RAT (e.g., 5G NR). For example, a venue may have a wireless NR modem (DU/DUe) installed within the entrance thereof for prospective customers to connect to, including those in the parking lot via inter alia, their NR or LTE-enabled vehicles or personal devices of operators thereof. Notably, different classes of DU/DUe 1506 may be utilized.

gNB Architectures

Referring now to FIGS. 15A-15D, various embodiments of the distributed (CU/DU) gNB architecture according to the present disclosure are described.

Figure 15A:
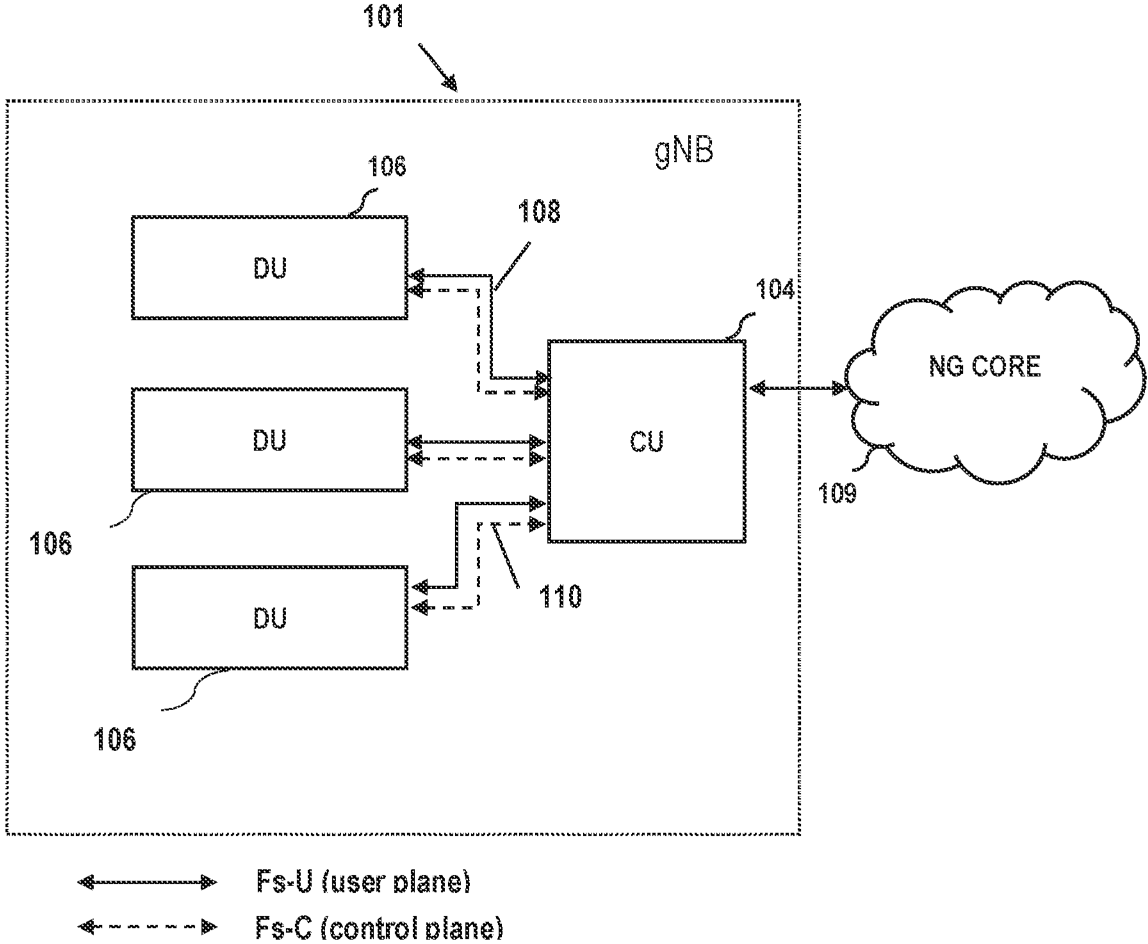
FIG. 15A is a functional block diagram illustrating one exemplary embodiment of a prior art gNB architecture including CU and multiple DUs.

As a brief aside, and referring to FIG. 15A, the prior art gNB shown (see FIG. 1 discussed above) includes the CU 104 (also known as gNB-CU) is a logical node within the NR architecture that communicates with the NG Core 109, and includes gNB functions such as transfer of user data, session management, mobility control, RAN sharing, and positioning; however, other functions are allocated exclusively to the DU(s) 106 (also known as gNB-DUs) per various "split" options described subsequently herein in greater detail. The CU 104 communicates user data and controls the operation of the DU(s) 106, via corresponding front-haul (Fs) user plane and control plane interfaces 108, 110.

The Fs interfaces 108, 110 include a (standardized) F1 interface. The F1 interface provides a mechanism for interconnecting a gNB-CU 104 and a gNB-DU 106 of a gNB 101 within an NG-RAN, or for interconnection of a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture, a gNB-DU 106 (or ngeNB-DU) is under the control of a single gNB-CU 104. When a gNB-DU is initiated (including power-up), it executes the F1 SETUP procedure (which is generally modeled after the S1 SETUP procedures of LTE) to inform the controlling gNB-CU of, inter alia, the number of cells (together with the identity of each particular cell) in the F1 SETUP REQUEST message. The gNB-CU at its discretion may choose to activate some or all cells supported by that gNB-DU, and even alter certain operational parameters relating thereto, indicating these selections/alterations in the F1 SETUP RESPONSE message. The identity of each cell to be activated is also included in F1 SETUP RESPONSE.

With that background, exemplary configurations of the inventive NR-U gNB 201 described previously are shown and discussed in detail. As shown in FIG. 15B, a first architecture includes a gNB 201 having an enhanced CU (CUe) 1504 and a plurality of enhanced DUs (DUe) 1506. These enhanced entities include respective software or firmware components (i.e., $LBT_{CU}$ and $LBT_{DU}$ modules 503*a*, 503*b*, respectively) and are enabled to permit multi-carrier utilization (including e.g., aggregation), whether autonomously or under control of another logical entity (such as the NG Core 209 with which the gNB communicates, or components thereof).

Figure 15B:
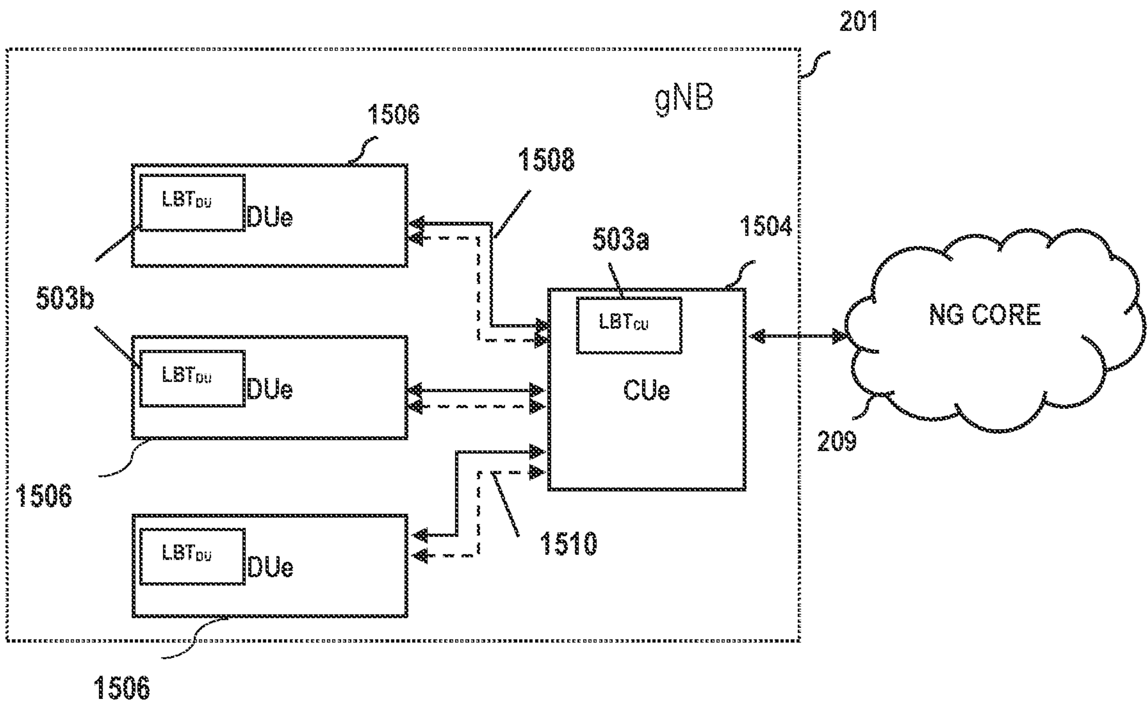
FIG. 15B is a functional block illustrating one exemplary embodiment of a gNB architecture including CUe and multiple DUs, according to the present disclosure.

The individual DUe's 1506 in FIG. 15B communicate data and messaging with the CUe 1504 via interposed physical communication interfaces 1508 and logical interfaces 1510. As previously described, such interfaces may include a user plane and control plane, and be embodied in prescribed protocols such as F1AP. It will be noted that in this embodiment, one CUe 1504 is associated with one or more DUes 1506, yet a given DUe is only associated with a single CUe. Likewise, the single CUe 1504 is communicative with a single NG Core 209, such as that operated by an MNO or MSO. Each NG Core 209 may have multiple gNBs 201 associated therewith.

Figure 15C:
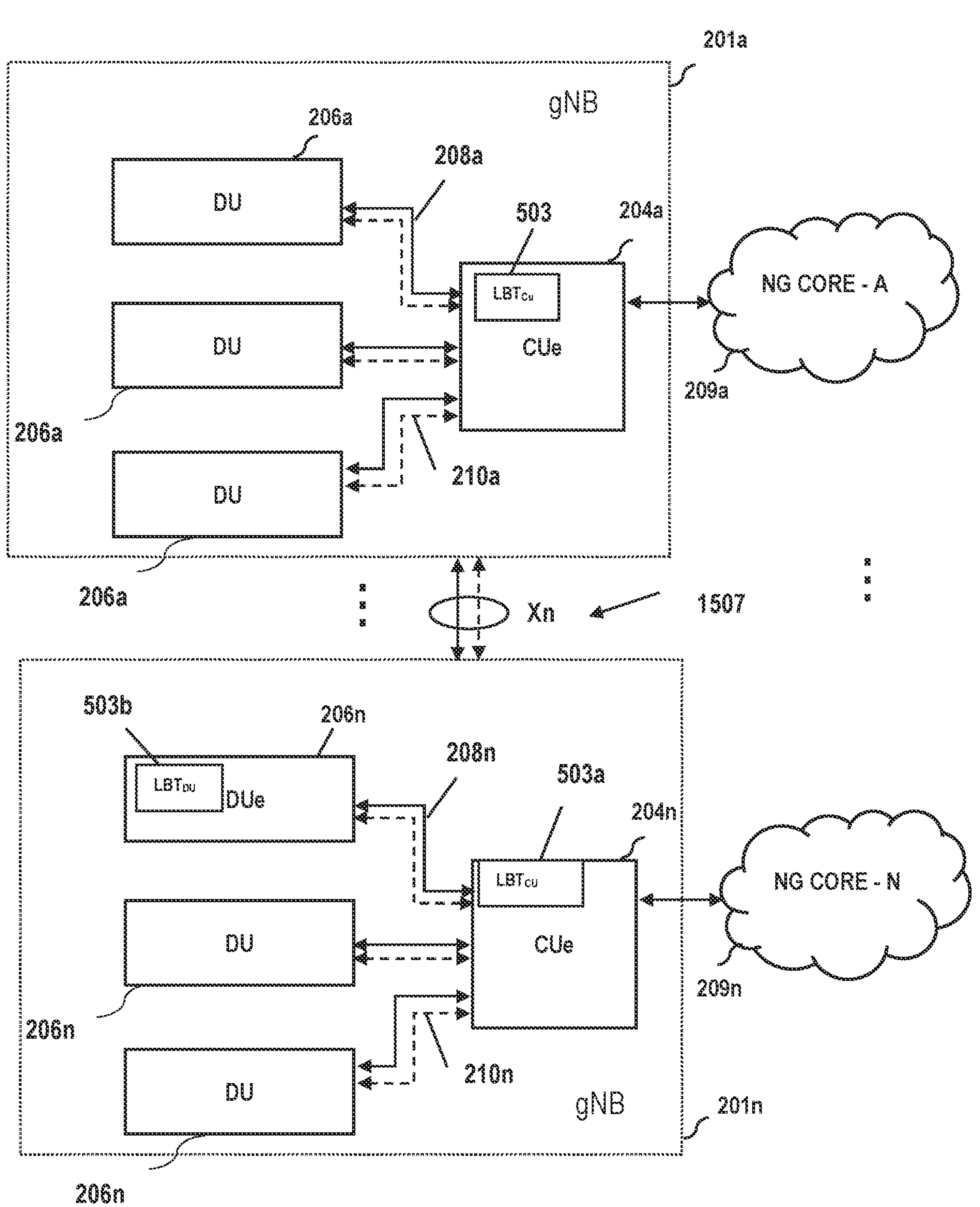
FIG. 15C is a functional block diagram illustrating of another exemplary embodiment of a gNB architecture including multiple CUe and multiple DUe corresponding, according to the present disclosure.

In the architecture of FIG. 15C, two or more gNBs 201*a-n* are communicative with one another via e.g., an Xn interface 1507, and accordingly can conduct at least CUe to CUe data transfer and communication. Separate NG Cores 209*a-n* are used for control and user plane (and other) functions of the network. Note that the two gNBs may be heterogeneous in their LBT/NR-U enhancement configurations as shown; e.g., in one gNB, only the CUe contains the LBT software/firmware upgrade 503, while in the other gNB, both CUe and DUe components include the LBT software/firmware 503 (which are communicative with one another).

Figure 15D:
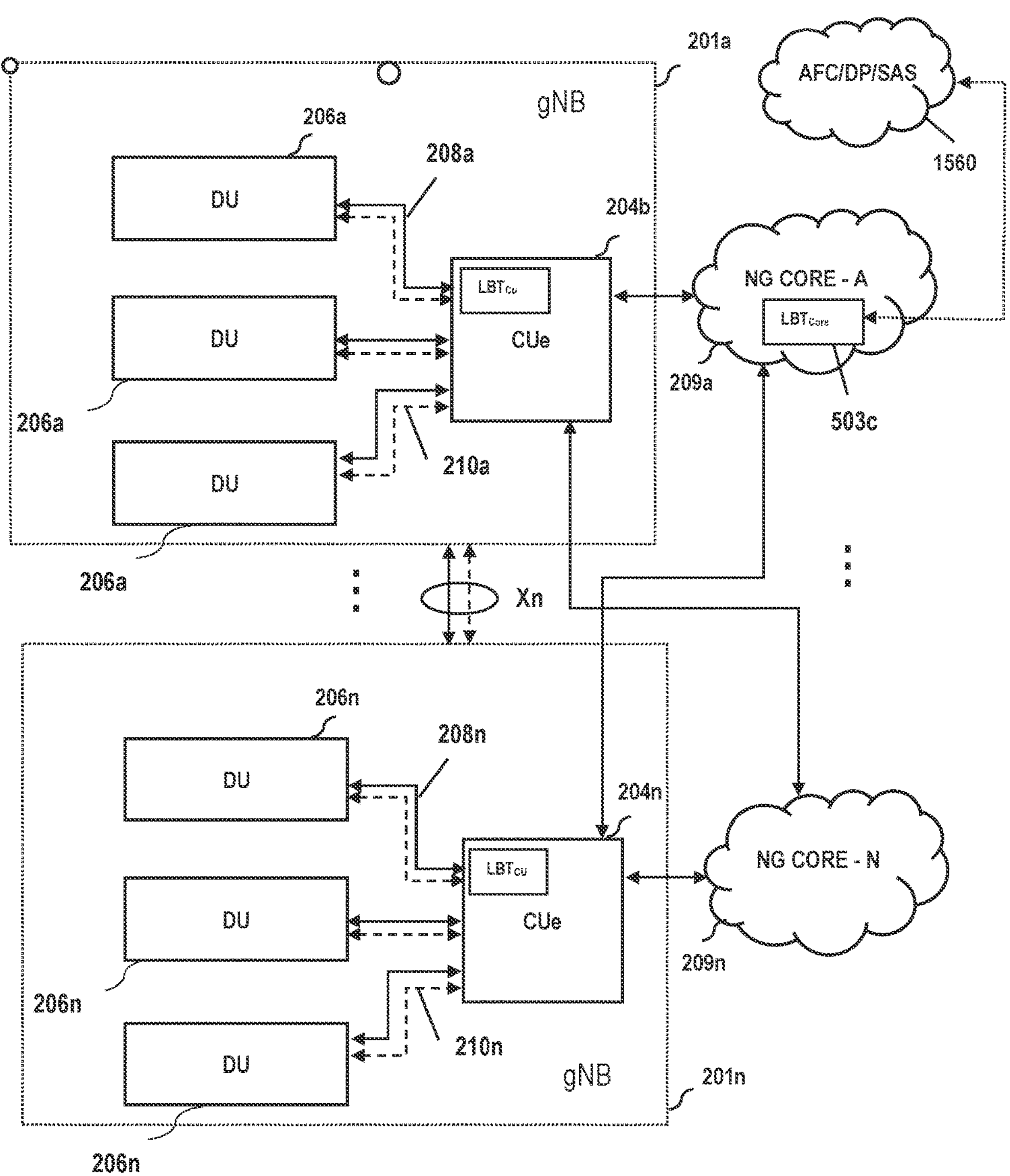
FIG. 15D is a functional block diagram illustrating another exemplary embodiment of a gNB architecture including multiple CUe apparatus logically cross-connected to multiple different cores, according to the present disclosure.

In the architecture of FIG. 15D, two or more gNBs 201*a-n* are communicative with one another via e.g., the Xn interface 1507, and accordingly can conduct at least CUe to CUe data transfer and communication. Moreover, the separate NG Cores 209*a-n* are logically "cross-connected" to the gNBs 201 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 201 other than its own, and so forth), or the gNBs 201 and NG Cores 209 may form a "mesh" topology where multiple Cores 209 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure.

As shown in FIG. 15D, one 5GC 209 contains an LBT NR-U software process 503*c* which is logically communicative with the LBT processes on the respective gNB CUes. It may also communicate with the aforementioned external entities such as AFC and/or CBRS DP/SAS 1560 if present (and relevant for the bands of interest).

It will also be appreciated that while described primarily with respect to a unitary gNB-CU entity or device 201 as shown in FIGS. 15B-15D, the present disclosure is in no way limited to such architectures. For example, the techniques described herein may be implemented as part of a distributed or dis-aggregated or distributed CU entity (e.g., one wherein the user plane and control plane functions of the CU are dis-aggregated or distributed across two or more entities such as a CU-C (control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 15B-15D. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-co-located with the eNB or femtocell, but still provide NR coverage within the macrocell coverage area.

In the 5G NR model, the DU(s) 1506 comprise logical nodes that each may include varying subsets of the gNB functions, depending on the functional split option. DU operation is controlled by the CU 1504 (and ultimately for some functions by the NG Core 209). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe 204 while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DUe(s) 1506; and (ii) RRC, PDCP in the CUe (with split user plane and control plane stacks), and RLC, MAC, physical layer and RF in the DUes 1506.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 1504, while MAC, physical layer, and RF are maintained in the DUe's.

Under Option 5 (Intra-MAC split), RF, physical layer and lower part of the MAC layer (Low-MAC) are in the DUes 1506, while the higher part of the MAC layer (High-MAC), RLC and PDCP are in the CUe 1504.

Under Option 6 (MAC-PHY split), the MAC and upper layers are in the CUe, while the PHY layer and RF are in the DUes 1506. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL (downlink) may occur independently. For example, in the UL, FFT (Fast Fourier Transform) and CP removal may reside in the DUes 1506, while remaining functions reside in the CUe 1504. In the DL, iFFT and CP addition may reside in the DUe 1506, while the remainder of the PHY resides in the CUe 1504.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as COMP, MIMO, load balancing, and mobility.

The foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

gNBe Apparatus—

Figure 16:
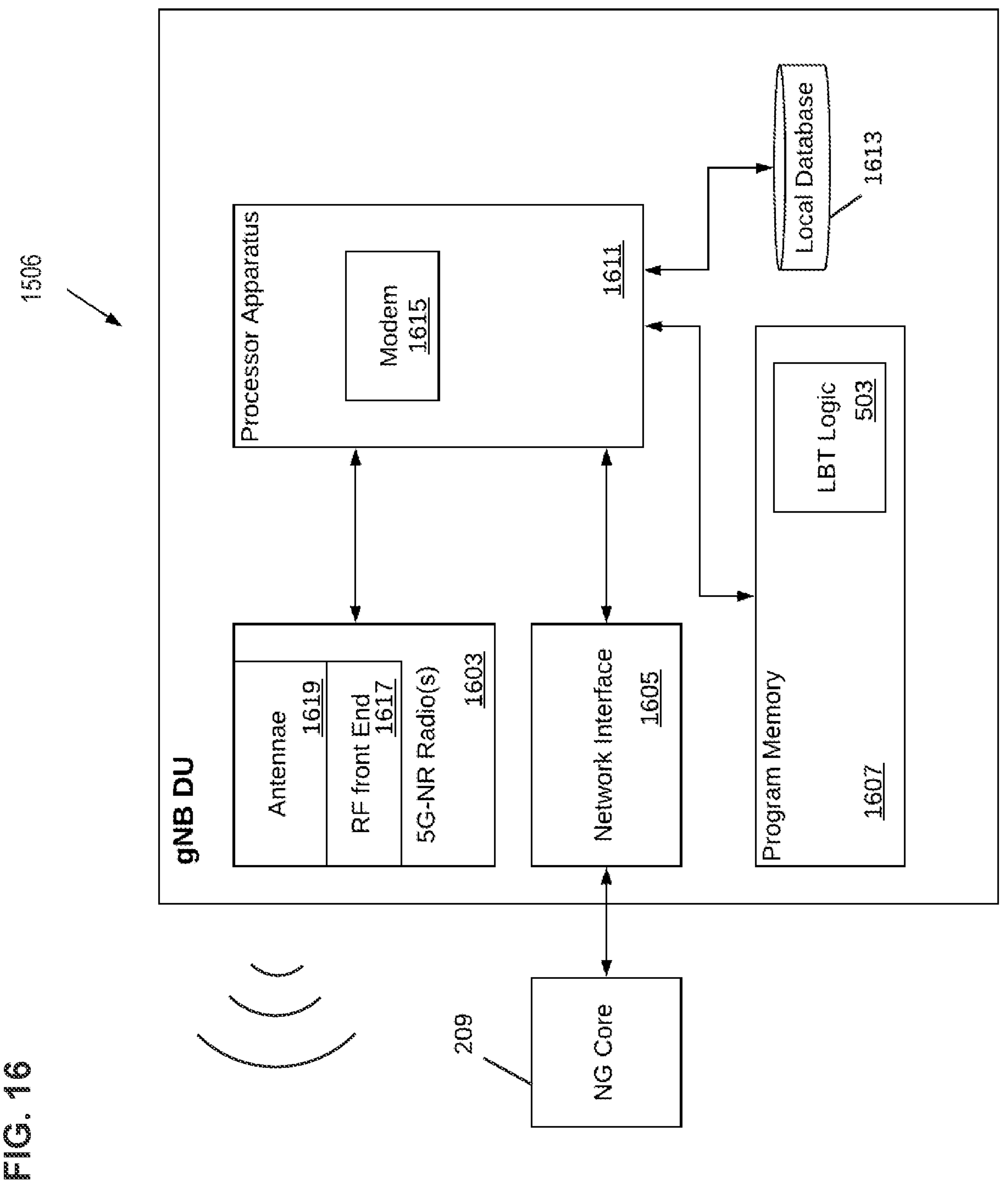
FIG. 16 is a functional block diagram of one embodiment of a 3GPP gNBe DUe (enhanced distributed unit) configured according to the present disclosure.

FIG. 16 illustrates a block diagram of an exemplary embodiment of a NR-U enabled gNB DU (i.e., DUe 1506) apparatus, useful for operation in accordance with the present disclosure.

In one exemplary embodiment as shown, the gNB DUe (which may for instance take any of the forms shown in FIGS. 15B-15D, including integrated CU/CUe 1504 and DUe 1506, distributed CU/DU, etc.) includes, inter alia, a processor apparatus or subsystem 1611, a program memory module 1607, logic 1609 (here implemented as software or firmware operative to execute on the processor 1611), a local database 1613, and wireless interfaces 1603 for communications with the relevant UEs or UEe (e.g., 4G/4.5G E-UTRAN and 5G-NR RAN, respectively).

The 5G RF interface 1603 may be configured to comply with the relevant PHY according to the relevant 3GPP NR standards which it supports (e.g., NR-U). The antenna(s) 1619 of the radios of the gNB(s) may include multiple spatially diverse individual elements in e.g., a MIMO-or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 1611 may include one or more of a digital signal processor, microprocessor, field-programmable gate array, or plurality of processing components mounted on one or more substrates. The processor apparatus 1611 may also comprise an internal cache memory, and modem 1615. In addition, the DUe includes an LBT module 503 of the type previously described herein with respect to FIGS. 5A-5B. In one example, the LBT module maybe implemented in any DUes 1506 (and/or CUe's of FIGS. 15A-15D) as software or firmware stored on a storage device and executed on the processor 1611.

The processing subsystem 1611 is in communication with a program memory module or subsystem 1607, where the latter may include memory which may comprise, e.g., SRAM, flash and/or SDRAM (e.g., GDDR5 or GDDR6) components. The memory module 1607 may implement one or more of direct memory access (DMA) type hardware, so as to facilitate data accesses as is well known in the art. The memory module of the exemplary embodiment contains one or more computer-executable instructions that are executable by the processor apparatus 1611. A mass storage device (e.g., HDD or SSD, or NAND/NOR flash or the like) is also provided as shown.

The processor apparatus 1611 is configured to execute at least one computer program stored in memory 1607 (e.g., the logic of the LBT module according to the methods of FIGS. 7-10 herein, in the form of software or firmware that implements the various functions). Other embodiments may implement such functionality within dedicated hardware, logic, and/or specialized co-processors (not shown).

In some embodiments, the logic 1609 also utilizes memory 1607 or other storage 1613 configured to temporarily and/or locally hold a number of data relating to the various associations for the various UE/UEe 203 which it services under the NR-U standard(s). In other embodiments, application program interfaces (APIs) may also reside in the internal cache or other memory 1607. Such APIs may include common network protocols or programming languages configured to enable communication between with other network entities (e.g., via API "calls" to or from the NG core 209).

UEe Apparatus—

Figure 17:
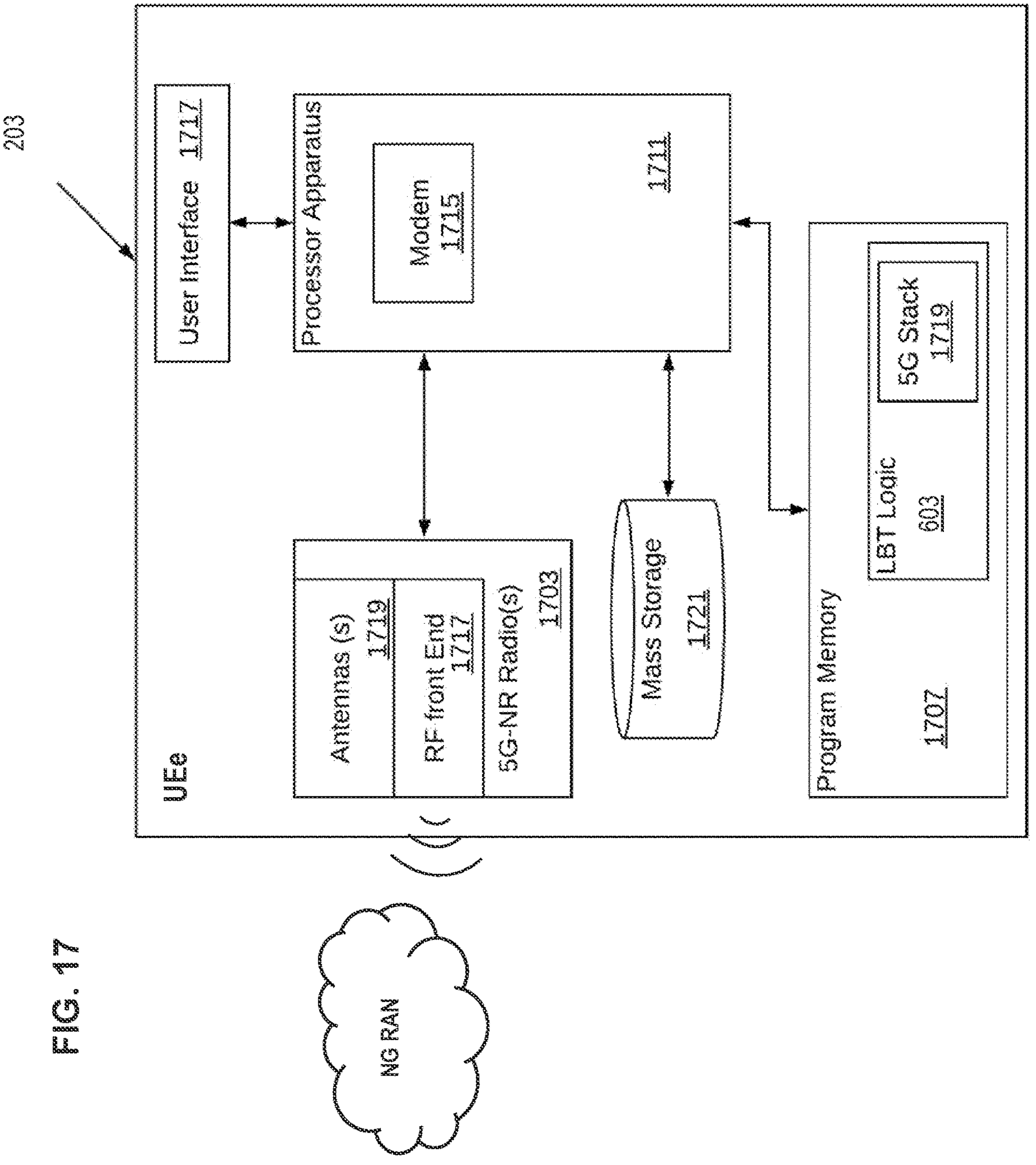
FIG. 17 is a functional block diagram of one embodiment of a 3GPP enhanced UE configured according to the present disclosure.

FIG. 17 illustrates a block diagram of an exemplary embodiment of an enhanced UE (UEe) apparatus 203, useful for operation in accordance with the present disclosure.

In one exemplary embodiment as shown, the UEe 203 includes, inter alia, a processor apparatus or subsystem 1711, a program memory module 1707, UE LBT logic 503 (here implemented as software or firmware operative to execute on the processor 1702), and wireless interface 1703 for communications with the relevant RANs (e.g., 5G-NR RAN). The RF interface 1703 are each configured to comply with the relevant PHY standards which it supports. The antenna(s) 1719 of the UEe radios may include multiple spatially diverse individual elements in e.g., a MIMO-or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 1711 may include one or more of a digital signal processor, microprocessor, field-programmable gate array, or plurality of processing components mounted on one or more substrates. The processor apparatus 1711 may also comprise an internal cache memory, and modem 1715. As indicated, the UEe includes an LBT module 503 on the program memory which is in communication with the processing subsystem, where the former may include memory which may comprise, e.g., SRAM, flash and/or SDRAM components. The memory module 1707 may implement one or more of direct memory access (DMA) type hardware, so as to facilitate data accesses as is well known in the art. The memory module of the exemplary embodiment contains one or more computer-executable instructions that are executable by the processor apparatus 1711. A mass storage device (e.g., HDD or SSD, or NAND/NOR flash or the like, such as via eMCC) is also provided as shown.

Other embodiments may implement the LBT functionality within dedicated hardware, logic, and/or specialized co-processors (not shown).

As noted, the UE 203 may include an LBT module 503 which is configured to determine the availability of unlicensed frequency band A and B. In one embodiment, the LBT module measures the channel parameters in the unlicensed spectrum, determine the availability of unlicensed frequency band. The LBT logic is in communication with the modem 1715 (via its execution on the processor) regarding the availability of unlicensed spectrum. The modem 1715 processes the basedband control and data signals for transmission and reception in the RF frond end module 1703.

In some embodiments, the UEe also utilizes memory 1707 or other storage 1721 configured to temporarily hold a number of data relating to the various network associations, and for the various services/applications such as voice, etc.) for the various functions described herein. In other embodiments, application program interfaces (APIs) such as those included in an MSO-provided application or those natively available on the Use may also reside in the internal cache or other memory 1707. Such APIs may include common network protocols or programming languages configured to enable communication with the UEc 203 and other network entities (e.g., via API "calls" to the UEe by MSO network processes tasked with NR-U carrier management).

As an aside, a downloadable application or "app" may be available to subscribers of an MSO or cable network (and/or the general public, including MSO "partner" MNO subscribers), where the app allows users to configure their $UE_e$ via the UI to implement enhanced functionality, including data collection and reporting back to the MSO core network so as to enable, inter alia, NR-U carrier availability when roaming, congestion, or other attributes which may be useful in implementing e.g., the methodologies of FIGS. 11-14C discussed above. Application program interfaces (APIs) may be included in MSO-provided applications, installed with other proprietary software that comes prepackaged with the UEe. Alternatively, the relevant MNO may provide its subscribers with the aforementioned functionality (e.g., as a pre-loaded app on the UEc at distribution, or later via download), or as a firmware update to the UEe stack conducted OTA.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method for providing multi-carrier utilization in an unlicensed frequency band, the method comprising:

performing real-time sensing comprising:

measuring one or more first channel sensing parameters with respect to a first frequency band; and measuring one or more second channel sensing parameters with respect to a second frequency band;

performing threshold comparisons comprising:

comparing the one or more first channel sensing parameters with one or more first thresholds; and comparing the one or more second channel sensing parameters with one or more second thresholds;

based on the comparing of the one or more first channel sensing parameters with the one or more first thresholds, determining an availability of the first frequency band;

based on the comparing of the one or more second channel sensing parameters with the one or more second thresholds, determining an availability of the second frequency band; and transmitting data in at least one of the first or the second frequency bands only if the respective band is determined to be available, wherein the transmitting comprises, for each of the first and the second frequency bands, dynamically enabling or disabling transmission in that band based on the real-time sensing and the threshold comparison for that band, such that simultaneous transmission in both of the first and the second frequency bands is performed only if both are available, and selective transmission is performed if only one is available.

2. The method of claim 1, wherein:

the method is performed by a Fifth Generation (5G) New Radio-Unlicensed (NR-U) capable device operating across the unlicensed frequency band;

the determining of the availability of the first frequency band comprises the 5G NR-U capable device performing a first Listen Before Talk (LBT) procedure; and the determining of the availability of the second frequency band comprises the 5G NR-U capable device performing a second LBT procedure.

3. The method of claim 1, wherein the transmitting of the data in the at least one of the first or the second frequency bands comprises causing suspension of the transmitting of the data on one of the first frequency band or the first frequency band until at least the comparing of the one or more second channel sensing parameters with the one or more second thresholds is completed.

4. The method of claim 1, further comprising:

initializing a computerized client device; and causing data communication between the computerized client device and a wireless access node, the causing of the data communication comprising establishing one or more communication channels which enable the computerized client device to receive data directing the computerized client device to utilize one or more LBT-based heterogeneous unlicensed band procedures to effect the determining of the availability of the first frequency band and the determining of the availability of the second frequency band.

5. The method of claim 1, wherein:

the first frequency band is associated with at least one first frame in a periodic Third Generation Partnership Project (3GPP) radio frame transmission;

the second frequency band is associated with at least one second frame in the periodic 3GPP radio frame transmission; and the method further comprises synchronizing one or more boundaries of the at least one first frame with one or more boundaries of the at least one second frame.

6. The method of claim 1, wherein the one or more first channel sensing parameters and the one or more second channel sensing parameters comprise one or more parameters relating to maximum and minimum backoff counter size.

7. The method of claim 1, further comprising transmitting a coordination signal, the coordination signal comprising a common preamble that has a specific signature or pattern that unlicensed spectrum-based devices attempt to detect.

8. The method of claim 7, wherein the coordination signal dynamically allocates at least one of (i) device-specific channel sensing or (ii) channel access data.

9. The method of claim 1, further comprising:

prior to transmitting the data, transmitting a coordination signal comprising a common preamble with a device-specific signature, wherein unlicensed spectrum-based devices attempt to detect the device-specific signature to coordinate multi-band access.

10. The method of claim 1, wherein the measuring of the one or more first channel sensing parameters and the measuring of the one or more second channel sensing parameters comprises measuring a backoff counter size for each frequency band.

11. A computerized wireless apparatus for use in a wireless infrastructure, the computerized wireless apparatus comprising:

digital processing apparatus;

at least one data network interface in data communication with the digital processing apparatus; and a storage device in data communication with the digital processing apparatus, the storage device comprising a storage medium having at least one computer program, the at least one computer program configured to, when executed on the digital processing apparatus, cause the computerized wireless apparatus to:

perform availability determinations for a first transmission opportunity, comprising:

perform a first Listen Before Talk (LBT)-based protocol to determine an availability of one or more first carriers in an unlicensed spectrum in a first frequency band; and perform a second LBT-based protocol to determine an availability of one or more second carriers in the unlicensed spectrum in a second frequency band;

perform transmission selections for the first transmission opportunity, comprising:

based on a determination that both the one or more first carriers and the one or more second carriers are available, concurrently transmit data over both the first frequency band and the second frequency band; and based on a determination that only one of (i) the one or more first carriers or (ii) the one or more second carriers, is available, transmit data exclusively over one of the first frequency band or the second frequency band which is associated with the available one of (i) the one or more first carriers or (ii) the one or more second carriers and suspend transmission over one of the first frequency band or the second frequency band which is associated with the unavailable one of (i) the one or more first carriers or (ii) the one or more second carriers; and repeat the availability determinations and the transmission selections prior to each subsequent transmission opportunity.

12. The computerized wireless apparatus of claim 11, wherein:

the first LBT-based protocol comprises:

(i) a measurement of a plurality of first channel sensing parameters for the first frequency band;

(ii) a comparison of the plurality of first channel sensing parameters to a plurality of first predetermined threshold values, respectively; and (iii) a determination, based on the comparison, of whether any device is transmitting on the one or more first carriers in the first frequency band; and the second LBT-based protocol comprises:

(i) a measurement of a plurality of second channel sensing parameters for the second frequency band;

(ii) a comparison of the plurality of second channel sensing parameters to a plurality of second predetermined threshold values, respectively; and (iii) a determination, based on the comparison, of whether any device is transmitting on the one or more second carriers in the second frequency band.

13. The computerized wireless apparatus of claim 12, wherein the computerized wireless apparatus comprises a Fifth Generation New Radio Unlicensed (5G NR-U) capable gNodeB, and the first and second frequency bands comprise a 5 GHz band and 6 GHz band, respectively.

14. The computerized wireless apparatus of claim 11, wherein the concurrent transmission of data over both the first frequency band and the second frequency band comprises utilization of the one or more first carriers simultaneously with the one or more second carriers to transmit at least one of 3GPP PDCCH control data or PDSCH user plane data on each of the one or more first carriers and the one or more second carriers.

15. Computer readable apparatus comprising a non-transitory storage medium, the non-transitory storage medium comprising at least one computer program having a plurality of instructions, the plurality of instructions configured to, when executed on a processing apparatus, cause a wireless user device to:

identify a first medium access protocol for use to determine an availability of a first unlicensed frequency band;

identify a second medium access protocol for use to determine an availability of a second unlicensed frequency band, the second unlicensed frequency band having access requirements different from those of the first unlicensed frequency band;

perform an availability evaluation comprising, prior to each data transmission, independently evaluate a current availability for each of the first and second unlicensed frequency bands via use of their respective medium access protocols;

perform a transmission selection comprising selection, for each transmission opportunity, to: (i) transmit data over both of the first and second unlicensed frequency bands only if both of the first and second unlicensed frequency bands are determined to be available, or (ii) transmit data solely over one of the first unlicensed frequency band or second unlicensed frequency band if only one is available, and to refrain from transmitting over any unlicensed frequency band determined to be unavailable; and repeat the availability evaluation and the transmission selection for each subsequent transmission opportunity.

16. The computer readable apparatus of claim 15, wherein the availability evaluation comprises use of the first medium access protocol and the second medium access protocol simultaneously.

17. The computer readable apparatus of claim 15, wherein the first medium access protocol comprises an energy detection protocol, and the second medium access protocol comprises a preamble detection protocol.

18. The computer readable apparatus of claim 15, wherein each of the first medium access protocol and the second medium access protocol comprise (i) measurement of data relating to one or more channel sensing parameters, and (ii) comparison of the data relating to the one or more channel sensing parameters to one or more thresholds.

19. The computer readable apparatus of claim 15, wherein the plurality of instructions are further configured to, when executed on the processing apparatus, cause the wireless user device to:

determine one or more bandwidth requirements; and compare the one or more bandwidth requirements to data relating to bandwidth availability of the at least one wireless access node, and invoke a multi-band operation, the multi-band operation comprising use of the first and second medium access protocols.

20. The computer readable apparatus of claim 19, wherein the invocation of the multi-band operation comprises:

a determination of a number of carriers needed to meet the one or more bandwidth requirements;

identification of two or more heterogeneous bands capable of servicing a request with sufficient bandwidth available to meet the one or more bandwidth requirements; and based at least on the identification of the two or more heterogeneous bands, commence the first and second medium access protocols on the first and second unlicensed frequency bands, respectively.

* * * * *